(12) United States Patent
Yamauchi

(10) Patent No.: US 8,850,186 B2
(45) Date of Patent: Sep. 30, 2014

(54) CHANGE IN IDENTIFICATION INFORMATION CAUSING REQUEST FOR NEW CERTIFICATE ISSUANCE

(75) Inventor: Hisayuki Yamauchi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 981 days.

(21) Appl. No.: 11/620,081

(22) Filed: Jan. 5, 2007

(65) Prior Publication Data
US 2007/0168658 A1    Jul. 19, 2007

(30) Foreign Application Priority Data
Jan. 17, 2006    (JP) .................................. 2006-009092

(51) Int. Cl.
*H04L 9/32* (2006.01)
*H04L 29/06* (2006.01)

(52) U.S. Cl.
CPC .......... *H04L 9/3268* (2013.01); *H04L 63/0823* (2013.01); *H04L 63/12* (2013.01)
USPC .......... 713/156; 713/155; 713/157; 713/158; 713/175; 726/5; 726/6; 726/10

(58) Field of Classification Search
CPC ..................... H04L 29/06775; H04L 2209/64; G06F 21/30
USPC .......... 713/3, 155, 156, 158, 223–225; 726/3, 726/5, 610, 16–18
See application file for complete search history.

(56) References Cited

U.S. PATENT DOCUMENTS 5,666,416 A * 9/1997 Micali ............................ 713/158
6,314,521 B1 * 11/2001 Debry ............................ 726/10
6,950,933 B1 * 9/2005 Cook et al. .................... 713/158
2004/0224771 A1 * 11/2004 Chen et al. ...................... 463/42
2006/0075219 A1 * 4/2006 Callaghan et al. ............ 713/156
2006/0143442 A1 * 6/2006 Smith ............................ 713/156

FOREIGN PATENT DOCUMENTS

| JP | 2001306733 A |   | 11/2001 |
| JP | 2003188873 A | * | 7/2003 |
| JP | 2004-007512 A |   | 1/2004 |
| JP | 2004015773 A |   | 1/2004 |

OTHER PUBLICATIONS

Office Action issued Sep. 22, 2011 for corresponding Japanese Patent Application No. 2003-188873A.
Japanese Office Action cited in Japanese counterpart application No. JP2011-253117, dated Jun. 21, 2013.

* cited by examiner

*Primary Examiner* — Alexander Lagor
(74) *Attorney, Agent, or Firm* — Rossi, Kimms & McDowell LLP

(57) ABSTRACT

An information processing apparatus that communicates using an electronic certificate is provided. When identification information is configured that identifies the information processing apparatus on a network, the configured identification information is stored in a storage unit. A request for issue of an electronic certificate containing the identification information stored in the storage unit is issued to a certificate authority. Once the request for issue is issued, a determination is made as to whether or not the identification information contained in the request for issue matches the identification information stored in the storage unit prior to obtaining the electronic certificate that is issued by the certificate authority in response to the request for issue. If it is determined that a mismatch exists, the user is notified to that effect.

10 Claims, 33 Drawing Sheets

FIG. 13

●HARDWARE INFORMATION CONFIGURATIONS

906

901 — IP ADDRESS : [ . . . ]

902 — SUBNET MASK : [ . . . ]

903 — DEFAULT GATEWAY : [ . . . ]

904 — HOSTNAME : [ ]

905 — DHCP CONFIGURATION : [VALID] [INVALID]

FIG. 18

●HARDWARE INFORMATION CONFIGURATIONS — 181

CONFIGURATIONS MAY NOT BE CHANGED, AS AN ELECTRONIC CERTIFICATE IS EITHER BEING REQUESTED FOR ISSUE, OR ELSE IS BEING MAINTAINED BY THE DEVICE

- IP ADDRESS : 192. 168. 0. 1
- SUBNET MASK : 255. 255. 255. 0
- DEFAULT GATEWAY : 192. 168. 0. 2
- HOSTNAME : device1.xxx.co.jp
- DHCP CONFIGURATION : [VALID] [INVALID]

FIG. 20

●CERTIFICATE SIGNING REQUEST (CSR)

THERE ARE NO CERTIFICATE SIGNING REQUESTS (CSRs) TO BE CANCELED. NO CERTIFICATE SIGNING REQUESTS (CSRs) ARE BEING PERFORMED

F I G. 24
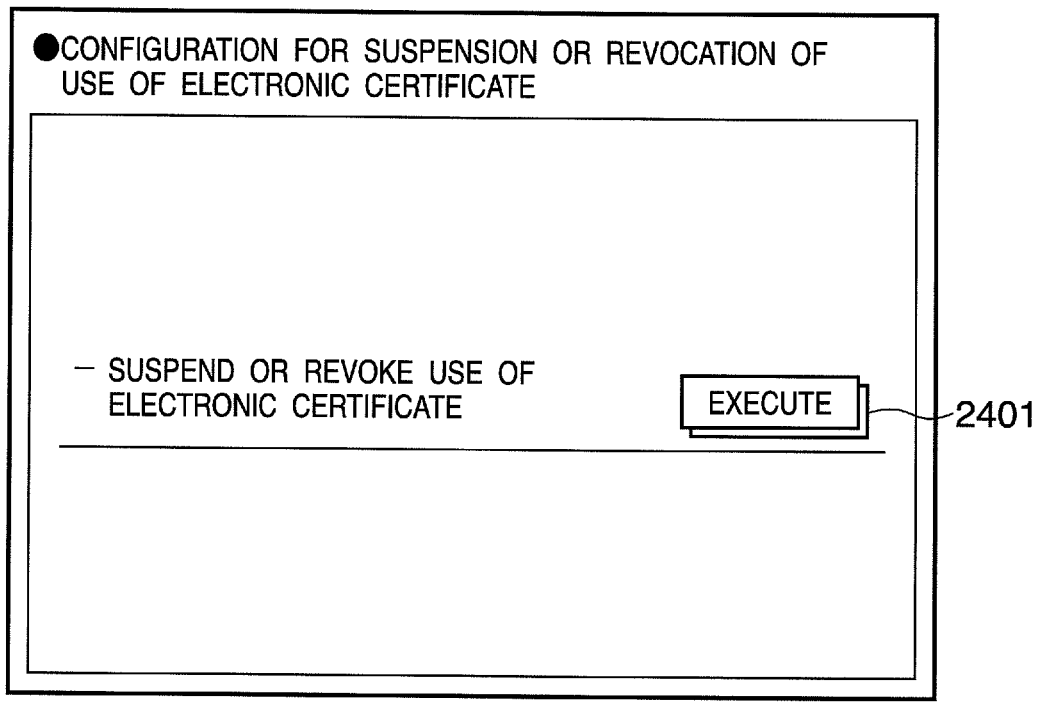

FIG. 27

●ALERT！！

HARDWARE CONFIGURATIONS OBTAINED VIA DHCP
DIFFER FROM HARDWARE CONFIGURATIONS CONTAINED
WITHIN CERTIFICATE SIGNING REQUEST (CSR) OR
ELECTRONIC CERTIFICATE. THE OBTAINED HARDWARE
INFORMATION IS THUS NOT CONFIGURED

VERIFY YOUR HARDWARE CONFIGURATIONS

CHANGE IN IDENTIFICATION INFORMATION CAUSING REQUEST FOR NEW CERTIFICATE ISSUANCE

BACKGROUND OF THE INVENTION

1. Field of the Invention

The invention relates to an information processing apparatus and control method, in particular, an information processing apparatus and control method that performs communications using an electronic certificate.

2. Description of the Related Art

A variety of encryption technologies are being used to authenticate a party to communications over a network, or to encrypt data that constitutes content of the communications. In particular, an encryption technology known as Public Key Infrastructure, or PKI, has been the most widely used encryption technology in recent years; see, for example, Japanese Patent Laid-Open 2004-007512.

The foundation of PKI is authentication technology that uses an electronic certificate, issued via public key encryption, including but not limited to RSA encryption or a digital signature, and an authentication agent known as a certificate authority, or CA, in order to guarantee a given party's identity.

Using the electronic certificate allows maintaining security of network communications, by performing client-server authentication, an exchange of data encryption keys, and performing an encrypted data communication using the keys so exchanged.

Secure Socket Layer (SSL) and Transport Layer Security (TLS), encrypted communication protocols in common use on the World Wide Web (WWW), perform client-server authentication, using an electronic certificate, prior to commencement of encrypted communications.

At present, the commonly used data format for electronic certificates is based on a standard known as X.509, a digital certificate specification drafted by the International Telecommunications Union (ITU). An electronic certificate in X.509 format is assembled from an X.509 version number, an electronic certificate serial number, public key information, identification information for the certificate authority that issued the electronic certificate, the certificate's expiration date, and identification information for the party being certified, i.e., the recipient of the electronic certificate.

When a CA issues an electronic certificate, data in the format of a Certificate Signing Request (CSR) is sent from the party being certified, that is, the recipient of the electronic certificate, to the CA. The CA issues the electronic certificate in accordance with the content described in the CSR.

A standard known as RFC2986 Internet X.509 Certificate Request Message Format Version 1.7, or PKCS#10, is used for the CSR format. It is typical for the CSR to contain such information as public key information maintained by the recipient of the electronic certificate, and information on the certified party, that is, the recipient of the electronic certificate.

Even if the CA issues an electronic certificate to a printing device or other information processing apparatus, i.e., client, it is necessary for the client to create a CSR containing public key information that it maintains, together with its identification information, and request that the CA issue the certificate.

Consider a situation in which a system is operated that performs such functions as issuing an electronic certificate from a CA to authenticate a client, or to use the electronic certificate to authenticate a client device on an Internet, WAN, or LAN environment. The CSR, namely, the request that the CA issue the electronic certificate to the client, contains identification information on the certified party, that is, the recipient of the electronic certificate, such as a subject field or subject alternative name field in the X.509 format. It is assumed that among the identification information is included such elements as a fully qualified domain name, or FQDN, or an IP address, which are allocated to the client, and that are described as client identification information.

A concrete case of use of an electronic certificate is performing access and processing from a terminal apparatus using such communications protocols as Internet Printing Protocol (IPP) over SSL.

The client is presumed to be a printing device for present purposes. After the terminal apparatus is connected to the printing device, and negotiation, i.e., establishment of an encryption algorithm and client-server authentication, is performed according to SSL protocols, encrypted printing data is transmitted to the print device. An electronic certificate is used in the server authentication process of negotiation.

Once the communication path encryption algorithm is established, the printer device, which is an SSL server, transmits an electronic certificate. The terminal apparatus performs verification of the signature contained in the received electronic certificate, and compares host identification information, including but not limited to the printing device server address, with the printer device identification information, which is contained in the electronic certificate that is transmitted by the printer device. These processes allow authentication for the purpose of identifying device spoofing.

If the printer device's host identification information is altered while the printer device is requesting that the CA issue an electronic certificate, however, the printing device identification information and the host identification information for the CSR and the electronic certificate will no longer match. A similar outcome obtains while using an electronic certificate issued by the CA, as well. In such circumstances, the problem that arises is that device authentication and identification of spoofing attempts cannot be carried out.

There are a particularly significant number of instances in LAN environments wherein an operation is carried out such that no FQDN is allocated to the printing device, while an IP address that is dynamically allocated by a DHCP server is treated as the host identification information. Alterations to the printing device host identification information under such circumstances raises a significant probability of the problem cited above occurring.

At such time as the printing device host identification information is altered, the printing device administrator must takes such steps as suspending use of the electronic certificate, submitting a request for a new electronic certificate, and updating the electronic certificate. It will also be necessary, however, for the administrator to actively perform a manual check to identify the mismatch between the host identification information and the electronic certificate printing device identification information. Moreover, if the administrator forgets to process submitting a request for a new electronic certificate or updating the electronic certificate, there is an additional risk that these checks may be delayed, and illicit certificates may continue to be issued and used. Added to this are increased administrative costs for reissuing of certificates every time host identification information changes, owing to the necessity for administrators or others traditionally to manually perform certificate reissuing procedures even when a mismatch is identified.

SUMMARY OF THE INVENTION

Therefore, a first object of the present invention is to achieve ease of identification on the part administrators of mismatches between information processing apparatus identification information and the information processing apparatus identification information contained in an electronic certificate.

A second object of the present invention is to provide an assembly that prevents mismatches between information processing apparatus identification information and the information processing apparatus identification information contained in an electronic certificate.

According to one aspect of the present invention, the foregoing object is attained by providing an information processing apparatus that performs communication using an electronic certificate, comprising:
- a configuration unit adapted to configure identification information for identifying the information processing apparatus on a network;
- a storage unit adapted to store the identification information configured by the configuration unit;
- a certificate request unit adapted to issue a first request for issue of the electronic certificate, containing the identification information stored in the storage unit, to a certificate authority;
- a determination unit adapted to determine whether or not the identification information stored in the storage unit has been altered between the time that the first request is issued by the certificate request unit, and the time that the electronic certificate issued by the certificate authority in response to the first request is obtained; and
- a notification unit adapted to issue a notification indicating that the identification information has been altered, when it is determined by the determination unit that the identification information has been altered.

According to other aspect of the present invention, the foregoing object is attained by providing an information processing apparatus that performs communication using an electronic certificate, comprising:
- a configuration unit adapted to configure identification information for identifying the information processing apparatus on a network;
- a storage unit adapted to store the identification information configured by the configuration unit; ca determination unit adapted to determine whether or not first identification information contained in an electronic certificate matches second identification information stored in the storage unit, if the electronic certificate issued by a certificate authority has been obtained; and
- a notification unit adapted to issue a notification indicating that the first and second identification information do not match, when it is determined by the determination unit that the first and second identification information do not match.

According to another aspect of the present invention, the foregoing object is attained by providing a control method for an information processing apparatus that is capable of configuring identification information for identifying itself on a network, and that is constituted such that the configured identification information is stored in a storage unit, as well as to perform communication using an electronic certificate, comprising the steps of:
- issuing a first request for issue of the electronic certificate, containing the identification information stored in the storage unit, to a certificate authority;
- determining whether or not the identification information stored in the storage unit has been altered between the time that the first request is issued and the time that the electronic certificate issued by the certificate authority in response to the first request is obtained; and
- issuing a notification indicating that the identification information has been altered, when it is determined in the determination step that the identification information has been altered.

According to still another aspect of the present invention, the foregoing object is attained by providing an information processing apparatus that performs communication using an electronic certificate, comprising:
- a configuration unit adapted to configure identification information for identifying the information processing apparatus on a network;
- a storage unit adapted to store the identification information configured by the configuration unit;
- a certificate request unit adapted to issue a first request for issue of the electronic certificate, containing the identification information stored in the storage unit, to a certificate authority; and
- a control unit adapted to prevent an alteration to the identification information, by the configuration unit, between the time that the first request is issued by the certificate request unit, and the time that the electronic certificate issued by the certificate authority in response to the request is obtained.

According to still another aspect of the present invention, the foregoing object is attained by providing a control method for an information processing apparatus that performs communication using an electronic certificate, the apparatus comprising a configuration unit adapted to configure identification information for identifying itself on a network, and a storage unit adapted to store the identification information configured by the configuration unit, the method comprising the steps of:
- issuing a first request for issue of the electronic certificate, containing the identification information stored in the storage unit, to a certificate authority; and
- preventing an alteration to the identification information, by the configuration unit, between the time that the first request is issued, and the time that the electronic certificate that is issued by the certificate authority in response to the first request is obtained.

According to still another aspect of the present invention, the foregoing object is attained by providing an information processing apparatus that performs communication using an electronic certificate, comprising:
- a configuration unit adapted to configure identification information for identifying the information processing apparatus on a network;
- a storage unit adapted to store the identification information configured by the configuration unit; and
- a control unit adapted to prevent an alteration, by the configuration unit, to identification information contained in an electronic certificate, if the electronic certificate issued by the certificate authority has been obtained.

According to still another aspect of the present invention, the foregoing object is attained by providing a control method for an information processing apparatus that performs communication using an electronic certificate, the apparatus comprising a configuration unit adapted to configure identification information for identifying itself on a network, and a storage unit adapted to store the identification information configured by the configuration unit, the method comprising the step of preventing an alteration, by the configuration unit, to identification information contained in an electronic certificate, if the electronic certificate issued by the certificate authority has been obtained.

Further features of the present invention will become apparent from the following description of exemplary embodiments with reference to the attached drawings.

BRIEF DESCRIPTION OF THE DRAWINGS

FIG. 13 is a diagram depicting an example of a user interface screen when altering printing device identification information according to the embodiment.

FIGS. 17 and 18 are diagrams depicting error message display examples according to the second embodiment.

FIG. 20 is a diagram depicting an example of an error screen in the event that no Certificate Signing Request (CSR) exists, according to the second embodiment.

FIG. 24 is a diagram depicting an example of a check screen for electronic certificate suspension or revocation operations according to the second embodiment.

FIG. 27 is a diagram depicting an example of an error screen for device information setting according to the third embodiment.

DESCRIPTION OF THE EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

Figure 1:
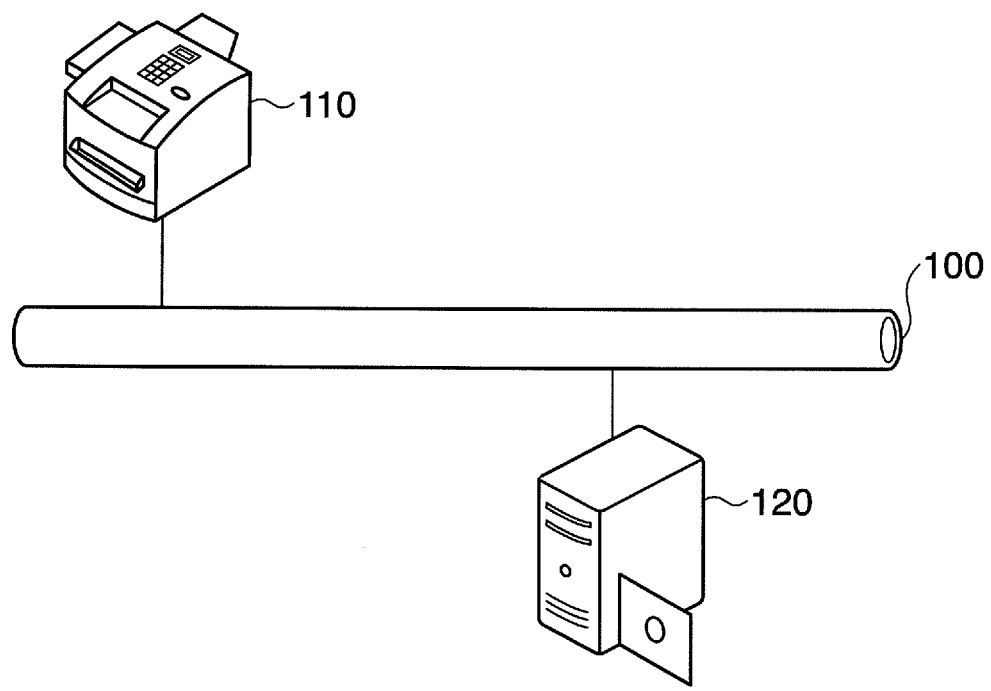
FIG. 1 is a diagram depicting an example of a network system assembly to which the present invention is applied.

FIG. 1 is a diagram depicting an example of a network system assembly to which the present invention is applied.

The network system according to the embodiment contains a printing device 110 and a server apparatus 120 as information processing apparatuses. The printing device 110 and the server apparatus 120 are connected via a network 100, and are constituted to facilitate two-way communication. That is to say, the printing device 110 and the server apparatus 120 are both devices with network support. Although only one printing device 110 is depicted for present purposes, a plurality of these devices may also be used. For example, the printing device 110 would be a Multi Function Peripheral, or MFP, which has a copying function as well as being usable as a network printer.

The printing device 110 is capable of configuring and storing such information as an IP address, an FQDN, or a DNS record/domain name as host identification information that identifies the printing device 110 on the network (identification information or hostname). When configuring an IP address as host identification information, it is permissible to have the IP address dynamically allocated by a DHCP server or other system (not shown in FIG. 1).

The printing device 110 is capable of using public key encryption to generate and maintain a private key and a public key to be used for such operations as authentication, encryption, and providing a digital signature. It is further possible for the printing device 110 to generate and submit a Certificate Signing Request (CSR) containing the host identification information and the public key, to the server apparatus 120 that executes a certificate authority service, or CA service, and obtain and maintain the electronic certificate that is issued by the server apparatus 120 in response to the CSR. It is additionally possible for the printing device 110 to transmit to the server apparatus 120 a revocation notification, either for the purpose of invalidating a CSR, or for the purpose of revoking an electronic certificate once it has been issued.

The server apparatus 120 includes a CA service function that performs electronic certificate issuing and administration. The CA service is capable of receiving a CSR from the printing device 110, issuing an electronic certificate in response to the CSR, and sending the issued electronic certificate to the printing device. It is also capable of receiving from the printing device 110 a revocation notification, either for the purpose of invalidating a CSR, or for the purpose of revoking an electronic certificate once it has been issued, and of revoking either the CSR or the electronic certificate in accordance with the revocation notification. The server apparatus 120 uses the CA service to perform electronic certificate issuing and administration for a networked apparatus. The server apparatus 120 may be referred to as the CA service hereinafter.

Such certificate administration protocols as the Certificate Management Protocols, or CMP, may be used as the control and communications protocols that are concerned with electronic certificate administration between the printing device 110 and the server apparatus 120. CMP uses such communications protocols as Hyper Text Transfer Protocol, or HTTP, and File Transfer Protocol, or FTP, for transport. It is permissible, of course, to use other pre-existing or proprietary electronic certificate administration control and communications protocols as well.

Figure 2:
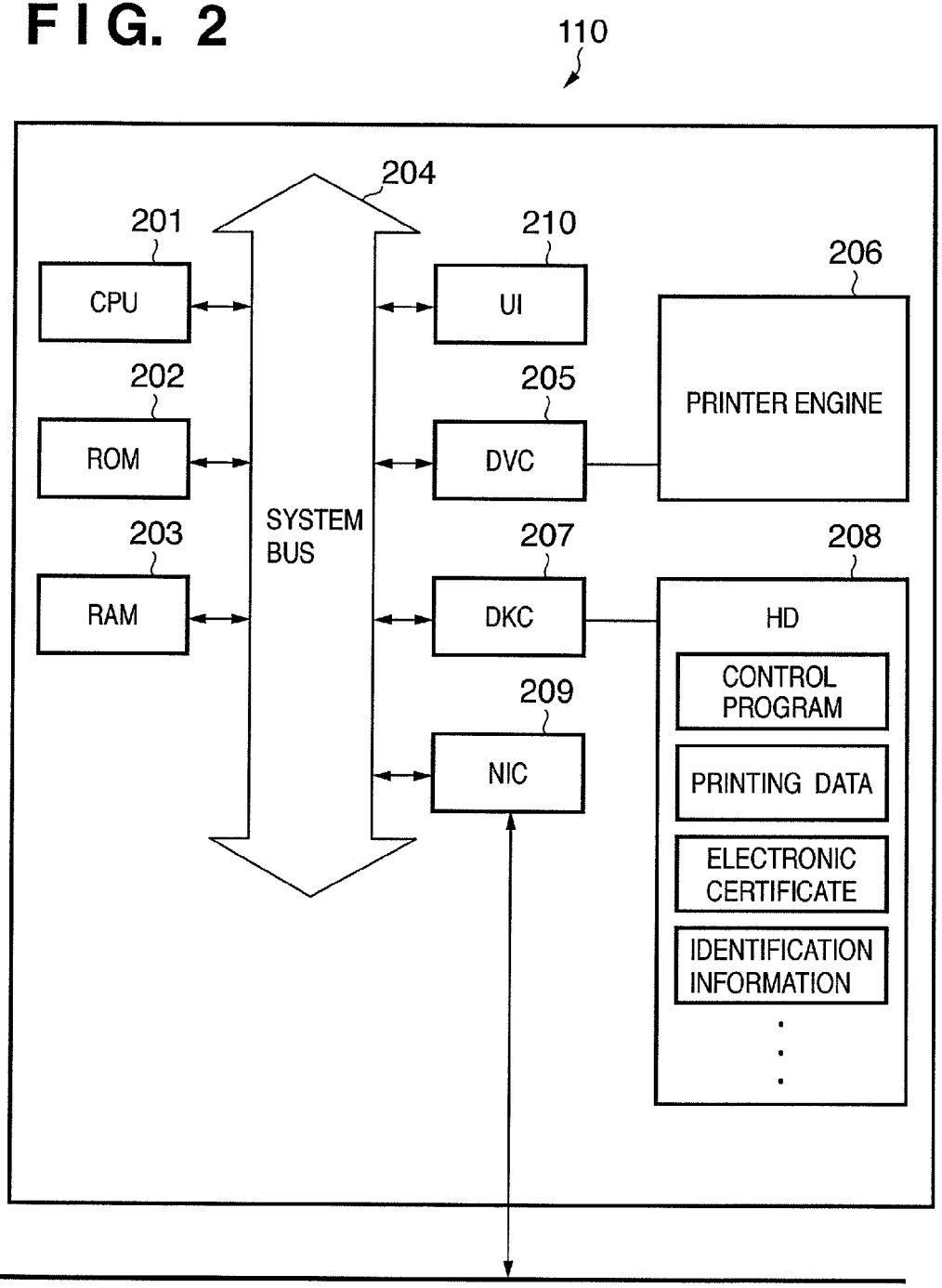
FIG. 2 is a block diagram that depicts an example of a printing device hardware assembly according to the embodiment.

FIG. 2 is a block diagram that depicts an example of a printing device hardware assembly.

The printing device 110 comprises a central processing unit, or CPU, 201. The CPU 201, for example, provides general control of all devices connected to a system bus 204 by executing a control program stored on a hard drive 208. RAM 203 both functions as main memory for the CPU 201, as well as providing a work area for the CPU 201.

No. 205 is a device controller, which controls a printer engine 206 that is concerned with the printing processing and other functions of the printing device 110. No. 207 is a hard drive controller, which controls access to a hard drive 208. A control program for carrying out device control and functions pertaining to the present invention are stored on the hard drive 208. Printing data is also spooled on the hard drive 208. It would also be possible to store acquired electronic certificate data or identification information for specifying the printing device 110 on the network. The control program may also be stored in a ROM 202, rather than the hard drive 208.

No. 209 is a network interface card, or NIC, for connecting to a network 100. No. 210 is a user interface, or UI, which may be constituted, for example, of a display screen and a touch screen input apparatus, and from which a user may perform the various printing device configurations or print execution operations.

Figure 10:
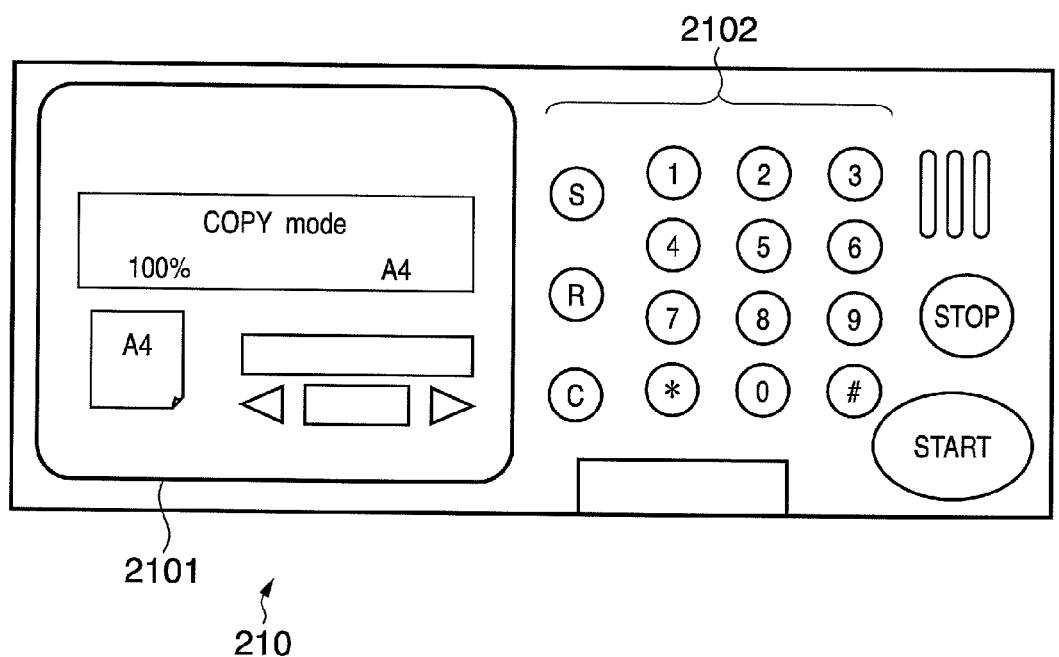
FIG. 10 is a diagram depicting an example of a printing device user interface assembly according to the embodiment.

FIG. 10 depicts an example of a user interface 210 assembly. No. 2101 is a touch screen, and the user may perform the various types of configurations by operating the touch screen. The example screen of the touch screen 2101 in FIG. 10 is a copy standby screen. No. 2102 is a ten-key pad, which is used for inputting numerical values, among other things. An S button is a service button; pressing this button brings up the various service screens on the touch screen, allowing performing services other than copying. An R button is a configuration button, and pushing this button brings up the various configuration screens on the touch screen, allowing performing parameter configuration. The various configuration screens for the various configuration processes described hereinafter are brought up pressing the R button, with the configurations themselves performed by touch screen or ten-key pad input on the configuration screens. A C button is a cancel button, which clears the various inputted configurations.

Figure 3:
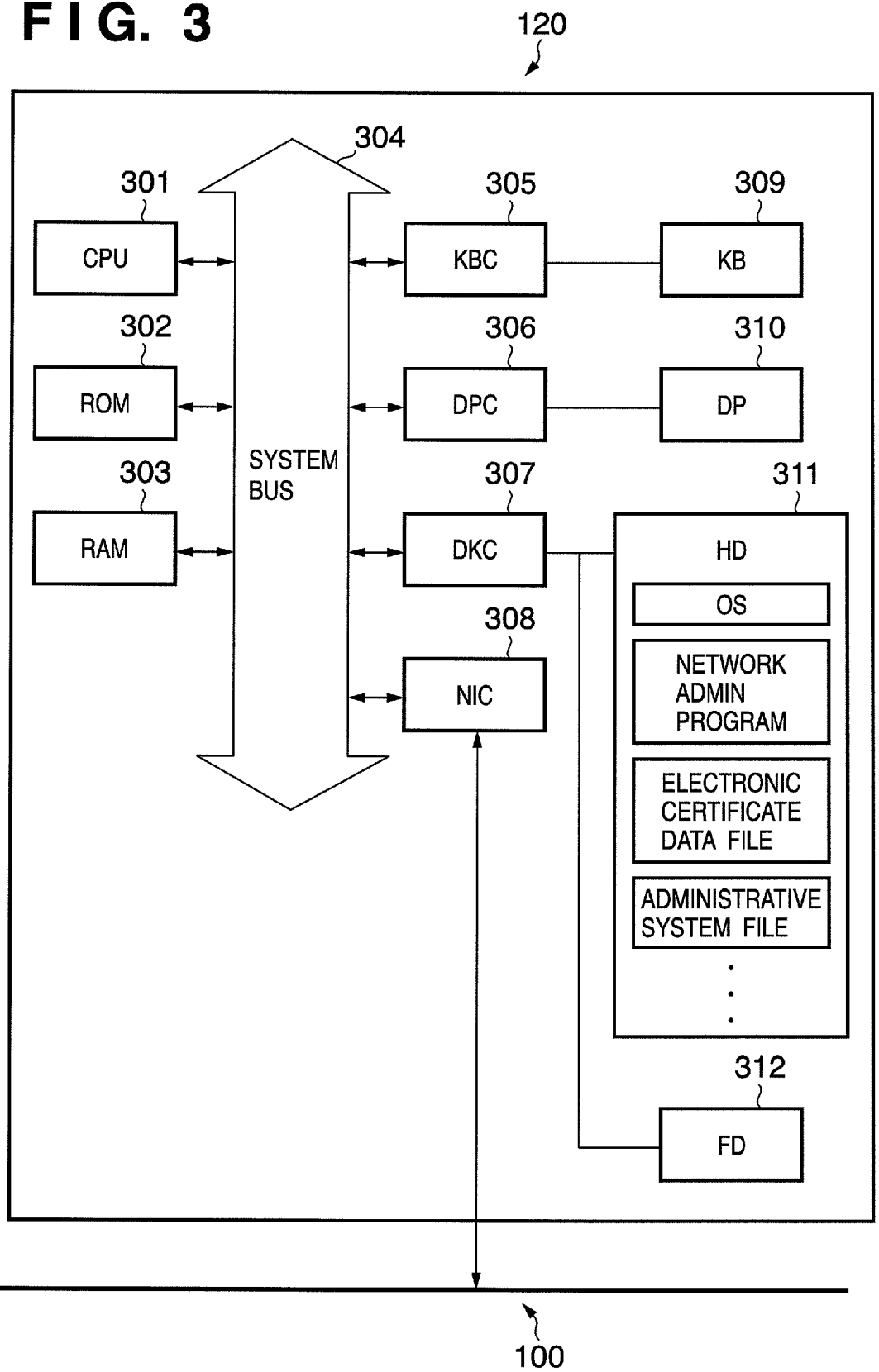
FIG. 3 is a block diagram that depicts an example of a server apparatus hardware assembly according to the embodiment.

FIG. 3 is a block diagram that depicts an example of a server apparatus 120 hardware assembly.

The server 120 comprises a CPU 301. The CPU 301 provides general control of all devices connected to a system bus 304 by executing a control program stored on a hard drive 311. It is permissible for the control program to be stored in a ROM 302, or to be supplied by a floppy disk 312 or other removable medium.

No. 303 is RAM, which both functions as main memory for the CPU 301, as well as providing a work area for the CPU 301. No. 305 is a keyboard controller, which controls directed input from such as a keyboard 309, or a pointing device (not shown).

No. 306 is a display controller, which controls the display on a display 310. No. 307 is a disk controller, which controls access to a hard drive 311 and a floppy drive 312. The hard drive 311 stores such things as an operating system, or OS, a network administration program, an electronic certificate data file, or an administration system file pertaining to electronic certificate administration.

No. 308 is a network interface card, or NIC, for connecting to a network 100.

Figure 4:
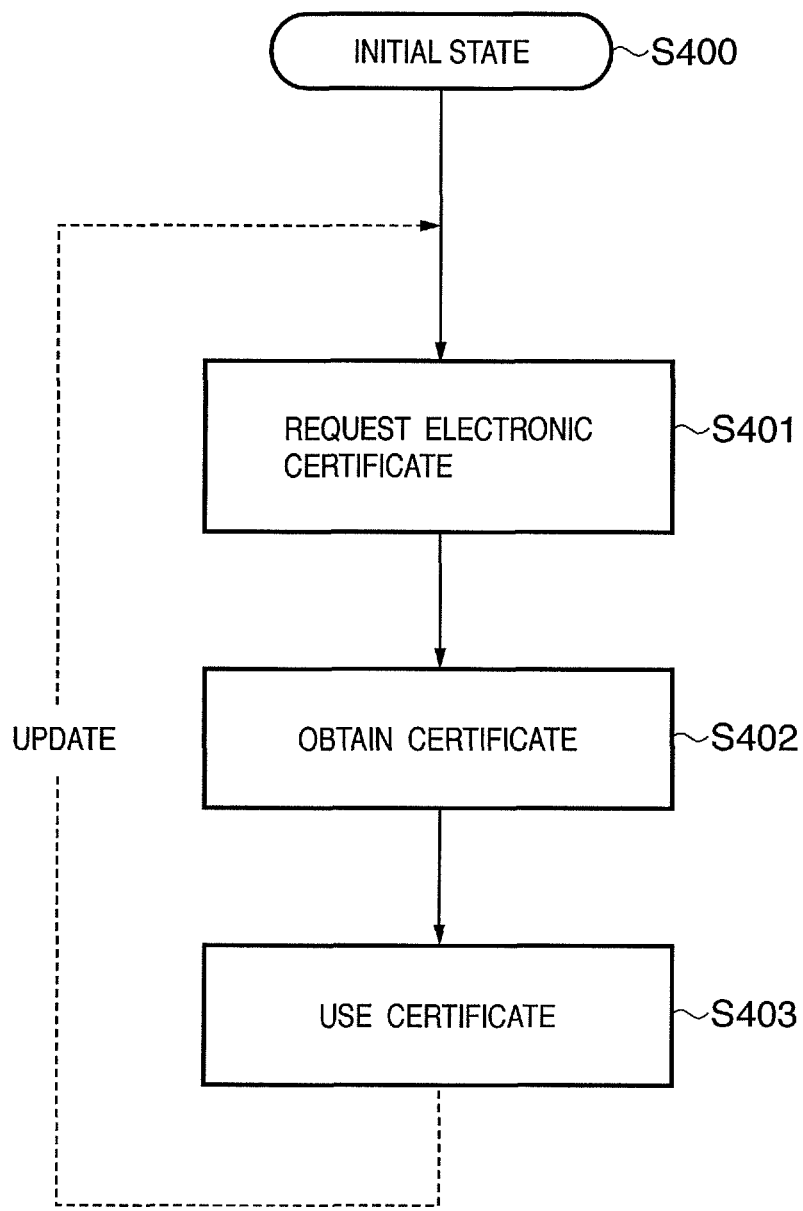
FIG. 4 is a flowchart that depicts an overview of operation of an electronic certificate pertaining to the printing device according to the embodiment.

FIG. 4 is a flowchart that depicts an overview of operation of an electronic certificate pertaining to the printing device 110.

The printing device 110 does not maintain an electronic certificate at its initial state such as a factory-shipped configuration (step S400). In step S401, the printing device 110 requests that an electronic certificate be issued, in order to get an electronic certificate issued from the server 120, as a certificate authority, or CA. An electronic certificate is issued for the printing device 110 from the CA 120, in response to the request. In step S402, the printing device 110 obtains the electronic certificate issued by the CA 120, stores it on the hard drive 208, as depicted in FIG. 2, and in step 403, commences use of the electronic certificate so obtained. In this manner, it is possible for the printing device 110 to perform secure communication using the electronic certificate.

The electronic certificate will be revoked for such reasons as expiration, and when it is necessary to renew a certificate that is in use, the process returns to the initial request state, in step S401, in order to perform a reissue of the electronic certificate. Electronic certificate operations are performed by repeating of cycles in such manner.

Figure 5:
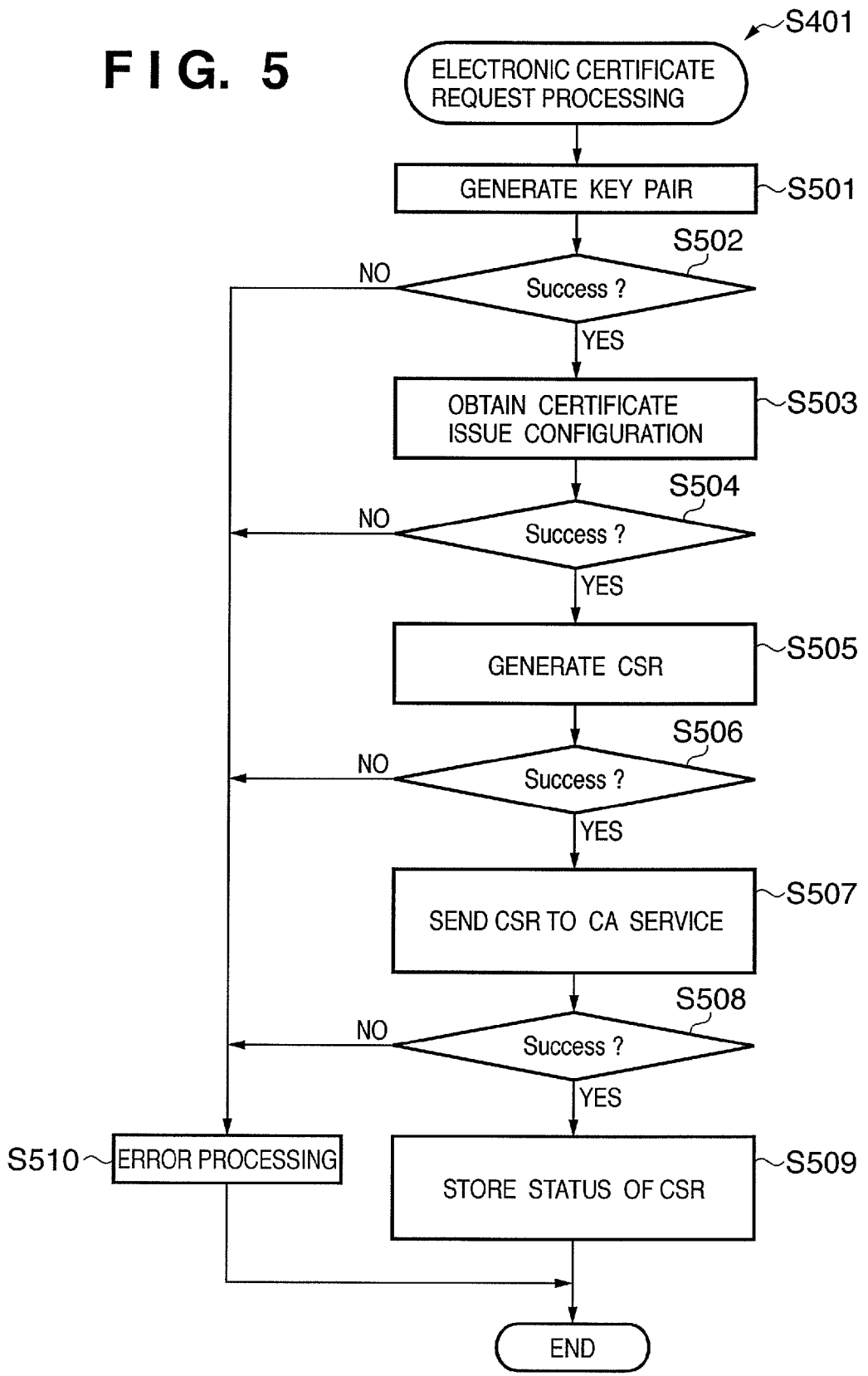
FIG. 5 is a flowchart that depicts an example of Certificate Signing Request processing according to the embodiment.

FIG. 5 is a flowchart that depicts an example of Certificate Signing Request processing as per step S401.

In step S501, the printing device 110 uses a public-key algorithm to generation a public key and private key pair. If the printing device 110 already maintains a public key and private key pair, the public key and private key pair that it maintains may be used in the following steps instead, without performing this processing.

If it is determined in step S502 that the public key and private key pair has been successfully generated, configuration information is obtained in step S503 in order to issue an electronic certificate. The configuration information includes the printing device 110 network hostname, and this information will be included in such places as a Subject Field or a Subject Alternative Name in the X.509 format, which is the electronic certificate recipient's identification information. It is permissible, of course, to include other locator information, etc. in the configuration. It is presumed that the configuration is set originally by a device administrator or other party on the printing device 110, and stored on the hard drive 208. It is also permissible for the device administrator to manually perform configuration whenever an electronic certificate is requested.

If it is determined in step S504 that the configuration information has been successfully obtained, processing proceeds to step S505, wherein a Certificate Signing Request (CSR) is generated and saved, based on the public-key data generated in step S501 and the configuration information obtained in step S503.

If it is determined in step S506 that the Certificate Signing Request (CSR) has been successfully generated, processing proceeds to step S507, wherein the Certificate Signing Request (CSR) data that was generated in step S505 is transmitted to the CA service, together with a Certificate Signing Request directive. According to the embodiment, a CA service is running on the network 100 that performs such operations as receiving the Certificate Signing Request, issuing the electronic certificate in accordance with the request for issue, and revoking the electronic certificate. Therefore, in step S507, the Certificate Signing Request (CSR) data is transmitted to the server apparatus 120, upon which the CA service is running. It is presumed that the CA service address information is configured originally by a device administrator or other party on the printing device 110, and stored on the hard drive 208.

If it is determined in step S508 that the Certificate Signing Request (CSR) has been successfully transmitted, processing proceeds to step S509, wherein status information is stored which signifies that an electronic certificate is being requested for issue, and processing ends.

If it is determined in steps S502, S504, S506, or S508 that any process has failed, the process proceeds to step S510, wherein error processing is performed. Conceivable error processing might include, but is not limited to, either of leaving error log information with the printing device 110, and performing error display processing on the printing device 110's user interface 210, or else notifying the printing device 110's administrator (device administrator) of error information via e-mail or the like.

The timing for performing a CSR may be such that the printing device 110 performs the CSR automatically in response to the printing device 110 detecting that it is not maintaining an electronic certificate, or it may wait to receive directions from the device administrator before performing the CSR.

Figure 6:
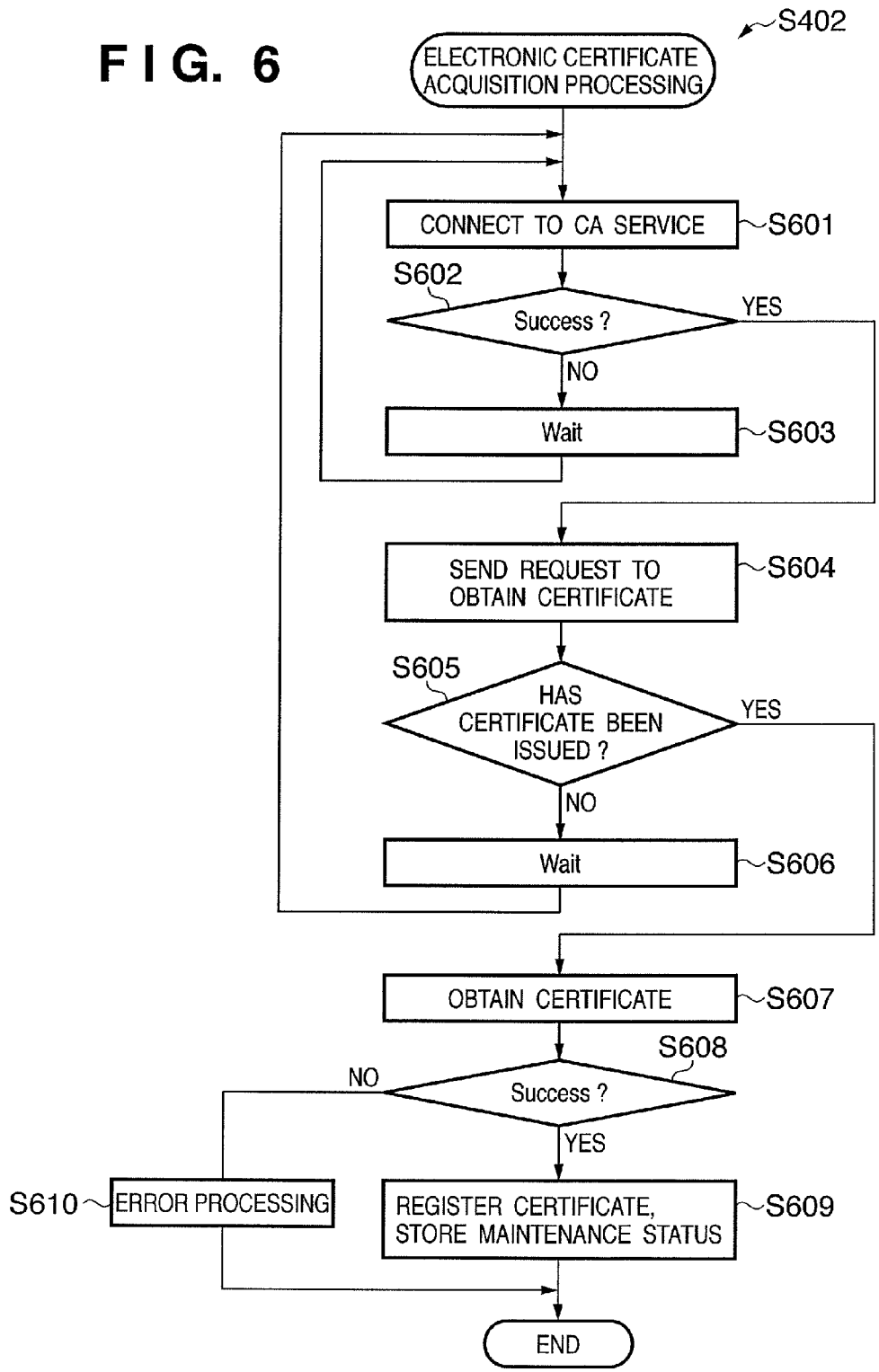
FIG. 6 is a flowchart that depicts an example of electronic certificate acquisition processing according to the embodiment.

FIG. 6 is a flowchart that depicts an example of electronic certificate acquisition processing in step S402.

As described, a CA service operates that performs tasks including but not limited to acknowledging a Certificate Signing Request (CSR) issuing an electronic certificate in accordance with the CSR, and revoking an electronic certificate, according to the embodiment. Hence, in the event that the status stored in FIG. 5, step S509 depicts that an electronic certificate is being requested for issue, the printing device 110 performs a query of the CA service per the following steps:

In step S601, the printing device 110 connects to the CA service. If it is determined in step S602 that the connection is successful, the process proceeds to step S604. If it is determined in step S602 that the connection has failed, the connection with the CA service is severed, and processing is suspended for a given period of time in step S603. The process then returns to step S601, and a connection retry is attempted.

In step S604, the printing device 110 makes a request of the CA service for acquisition of an electronic certificate that the printing device 110 had requested be issued by the CA service. The acquisition request contains identification information for the recipient of the electronic certificate from when the printing device 110 requested that the certificate be issued. The information allows the CA service to make a determination about the requested certificate. Any identification information may be included in the acquisition request, however, provided that the information facilitates identifying the requested certificate.

If the requested electronic certificate has been issued by the CA service, a response to that effect will be sent, a determination to that effect will be made in step S605, and the process proceeds to step S607. If the requested electronic certificate has not been issued, a response to that effect will be sent, a determination to that effect will be made in step S605, the connection with the CA service will be severed in step S606, and processing suspended for a given period of time. The process then returns to step S601, and a connection and certificate acquisition retry is attempted.

It is presumed that it will be possible for a device administrator or other party to perform configurations when processing is suspended in steps S603 and S606.

In step S607, the electronic certificate data sent from the CA service is acquired, and if it is determined in step S608 that the acquisition is successful, the process proceeds to step S609. In step S609, the acquired electronic certificate is registered as an electronic certificate for the printing device 110, status information indicating that the printing device 110 maintains the electronic certificate, and the process ends.

Once the process has ended properly, it will be possible to use the electronic certificate, and the printing device 110 will be able to run an SSL server or other applications that use the electronic certificate.

If it is instead determined in step S608 that the acquisition has failed, the process proceeds to step S610, wherein error processing is performed. Conceivable error processing might include, but is not limited to, either of leaving error log information with the printing device 110, and performing error display processing on the printing device 110's user interface 210, or else notifying the printing device 110's administrator (device administrator) of error information via e-mail or the like.

The timing for performing an electronic certificate acquisition may be such that the printing device 110 performs the electronic certificate acquisition automatically in response to the printing device 110 detecting that it is requesting that an electronic certificate be issued, or it may wait to receive directions from the device administrator before performing the electronic certificate acquisition.

The following problem arises when using an electronic certificate pursuant to a workflow of the preceding sort.

The problem begins when the printing device 110's hostname changes after a request for issue of an electronic certificate, in step S401, and the acquisition of the electronic certificate, in step S402. If this happens, the printing device 110's host identification information at the time of the acquisition of the electronic certificate will be at odds with the printing device 110's identification information as contained in the issued electronic certificate. A similar outcome will result even if the electronic certificate is maintained in step S403 or later in the process. That is, if the printing device 110's hostname changes, the hostname will be at odds with the printing device 110's identification information as contained in the electronic certificate maintained by the printing device 110.

If a mismatch such as the foregoing occurs, it will be necessary for the device administrator to perform such tasks as requesting that the electronic certificate be re-issued, and renewing the electronic certificate. It will be necessary, however, for the administrator to manually check the printing device's configurations, in order to identify the mismatch between the hostname and the electronic certificate. This is a complicated and annoying task. If the administrator forgets to request that the electronic certificate be re-issued, or to renew the electronic certificate, it is also possible that the manual check may be delayed, and an illicit certificate may continue to be issued and used. The fact that it has traditionally been necessary for the administrator or other party to manually perform the procedures vis-à-vis the CA for having the certificate be re-issued, even if the mismatch is detected, administration costs are incurred for having a certificate re-issued whenever a hostname is changed.

The problem is resolved with the following embodiments.

First Embodiment

Figure 7A:
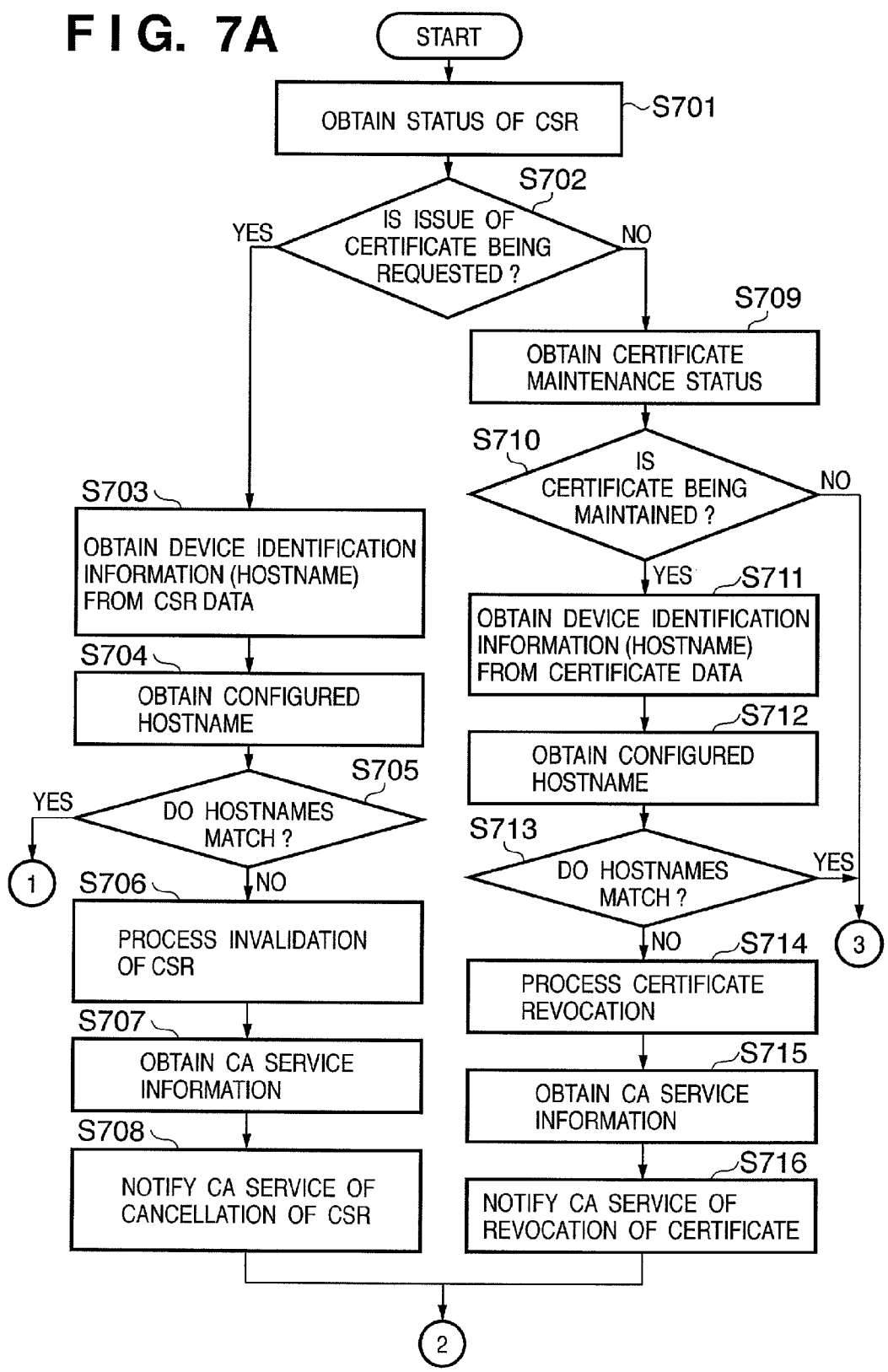
FIGS. 7A-B are flowcharts that depicts an example of electronic certificate identification information mismatch notification processing according to the first embodiment.
Figure 7B:
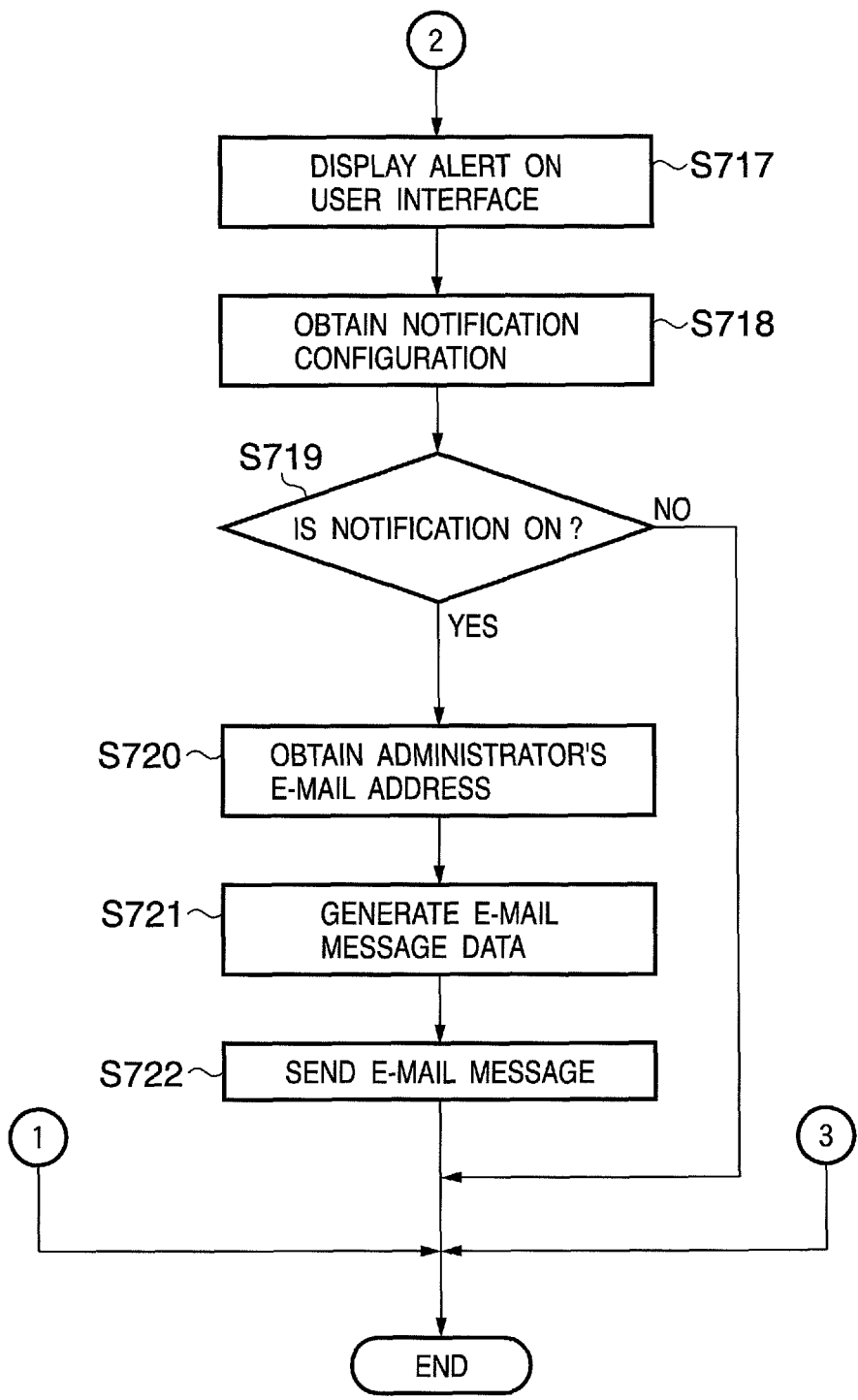

FIGS. 7A-B are flowcharts that depicts an example of electronic certificate identification information mismatch notification processing of notifying the administrator when the printing device 110's host identification information configured in the electronic certificate is at odds with the actual identification information, because the printing device 110's hostname changes.

This process commences at a specified timing, which may include, but is not limited to, the printing device 110's startup time, or the time when the printing device 110's configuration values are changed.

In step S701, the printing device 110 obtains the Certificate Signing Request (CSR) status information as stored in step S509.

If the status information obtained in step S701 indicates that an electronic certificate is being requested for issue in step S702, the process proceeds to step S703. If, on the other hand, the status information indicates that an electronic certificate is not being requested for issuer the process proceeds to step S709.

In step S703, the hostname that constitutes the printing device identification information, and that is contained in the Certificate Signing Request (CSR) data that was generated and stored in step S505, is obtained. In step S704, the hostname that currently is configured for the printing device 110 is obtained. In step S705, the two hostnames obtained in step S703 and S704 are compared, and the process proceeds to step S706 if it is determined that the hostnames do not match. If, on the other hand, it is determined that the hostnames do match, a mismatch has not occurred between the content of the Certificate Signing Request (CSR) and the current printing device 110 identification information, and the process ends.

In step S706, the Certificate Signing Request (CSR) status information obtained in step S701 is deleted, as a process for invalidating the Certificate Signing Request, or CSR. In step S707, the location information for the CA service for which the electronic certificate issue request has been made is obtained. In step S708, a Certificate Signing Request (CSR) cancellation notice is sent to the obtained CA service location. A concrete instance would be to issue a Certificate Signing Request (CSR) cancellation request to the CA service. The process proceeds to step S717.

The Certificate Signing Request (CSR) cancellation notice contains the identification information for the recipient of the electronic certificate from the time at which the printing device itself requested that the electronic certificate be issued. This allows the CA service to identify and adjudicate the Certificate Signing Request (CSR) for which it is to perform the cancellation. Any identification information may be included in the cancellation notice, however, aside from this identification information, provided that it allows identification of the Certificate Signing Request (CSR) to be canceled.

If the determination in step S702 led to step S709, then in step S709, the maintained electronic certificate status information that was stored in FIG. 6, step S609, is obtained. In step S710, if the status information that was obtained in step S709 indicates that the printing device 110 is maintaining an electronic certificate, the process proceeds to step S711. If, on the other hand, the status information indicates that the printing device 110 is not maintaining an electronic certificate, the process ends.

In step S711, the printing device hostname is obtained from the maintained electronic certificate that contains it. In step S712, the hostname that currently is configured for the printing device 110 is obtained. In step S713, the two hostnames obtained in step S711 and S712 are compared, and the process proceeds to step S714 if it is determined that the hostnames do not match. If, on the other hand, it is determined that the hostnames do match, a mismatch has not occurred between the content of the Certificate Signing Request (CSR) and the current printing device 110 identification information, and the process ends.

In step S714, status information obtained in step S709 is deleted, as a process for revoking the maintained electronic certificate. In step S715, the location information for the CA service for which the electronic certificate issue request has been made is obtained. In step S716, an electronic certificate revocation request notice is sent to the obtained CA service location. A concrete instance would be to issue an electronic certificate revocation request to the CA service. The process proceeds to step S717.

In step S717, an error display is displayed on the printing device 110's user interface 210 to the effect that, owing to a change in the hostname, either the Certificate Signing Request (CSR) has been canceled, or that the electronic certificate has been revoked. Furthermore, in step S718, a configuration value is obtained as to whether or not to perform an error notification to the device administrator.

It is possible for the device administrator to pre-record the error notification implementation configuration and the device administrator's e-mail address in the printing device 110. If it is determined in step S719 that the configuration to perform an error notification to the device administrator is valid, the process proceeds to step S720, wherein the pre-recorded device administrator's e-mail address is obtained. In step S721, e-mail data describing the content of the error is generated. In step S722, the device administrator is notified that an error has occurred by the sending of the e-mail generated in step S721.

If, on the other hand, the error notification configuration is invalid in step S719, the process ends without performing the e-mail notification processing in steps S720-S722.

While the example describes an example of using e-mail as a process of notifying the device administrator of an error, it is permissible to use other communications protocols or communications units to perform an error notification as well.

In the example, when a mismatch is detected in the hostname, a process is performed in which either the Certificate Signing Request (CSR) is canceled, or the electronic certificate is revoked. It is permissible, however, to either perform a display of an error on the user interface screen, or else to merely perform a notification to the device administrator, without the printing device itself automatically performing the process itself. In this case, the device administrator will be able to perform the operations that restore the changed hostname to the original hostname, and either perform a re-issue of the Certificate Signing Request (CSR) or else renew the electronic certificate. It is also permissible to have a process assembly in which either the Certificate Signing Request (CSR) is canceled, or the electronic certificate is revoked, in response to the device administrator's commands.

This process allows the printing device administrator to use changes in identification information of the information processing apparatus printing device to easily detect when a mismatch occurs between the identification information and the printing device identification information contained in the electronic certificate.

Figure 8A:
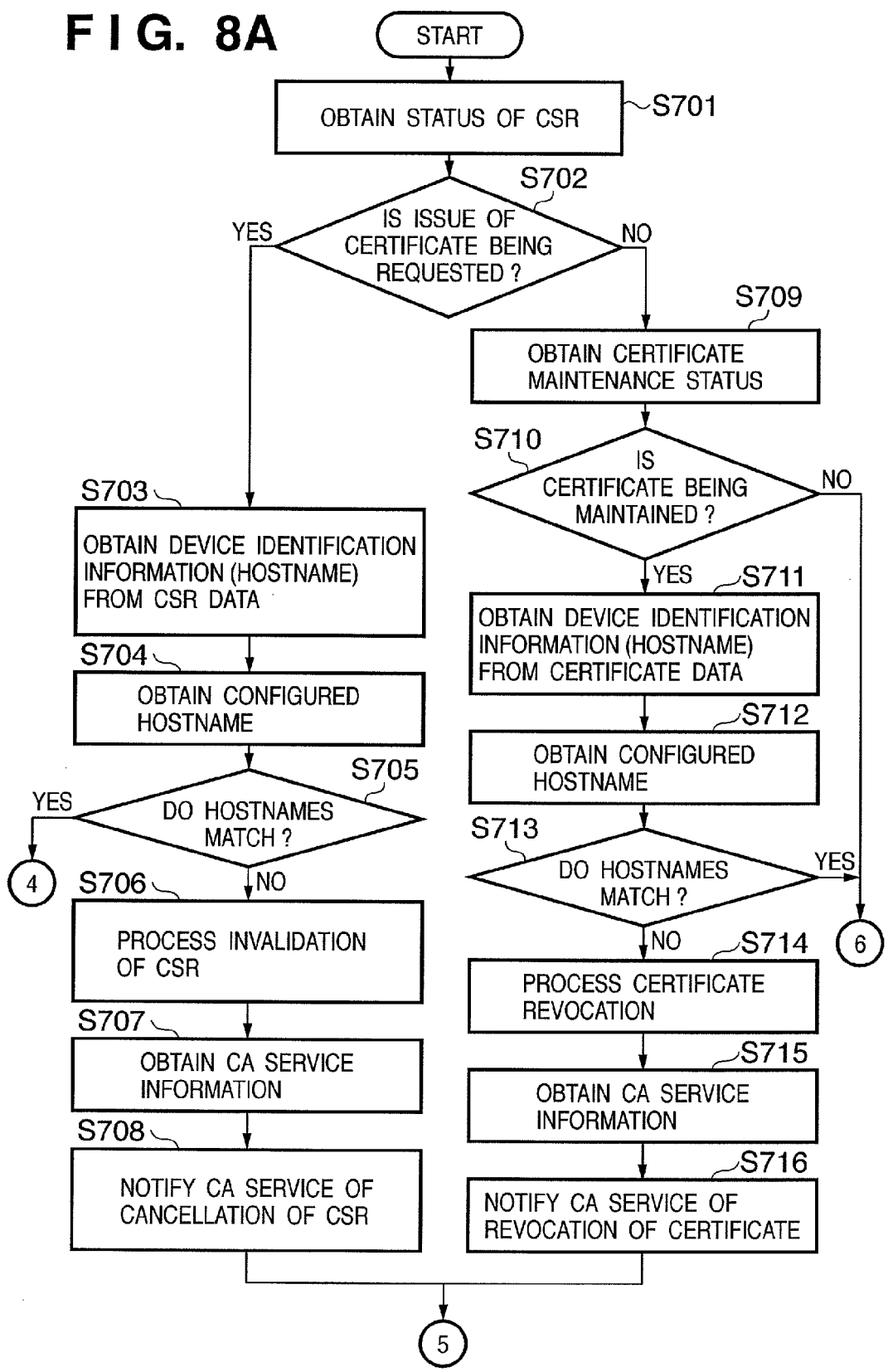
FIGS. 8A-B are flowcharts that depicts a modified example of FIGS. 7A-B.
Figure 8B:
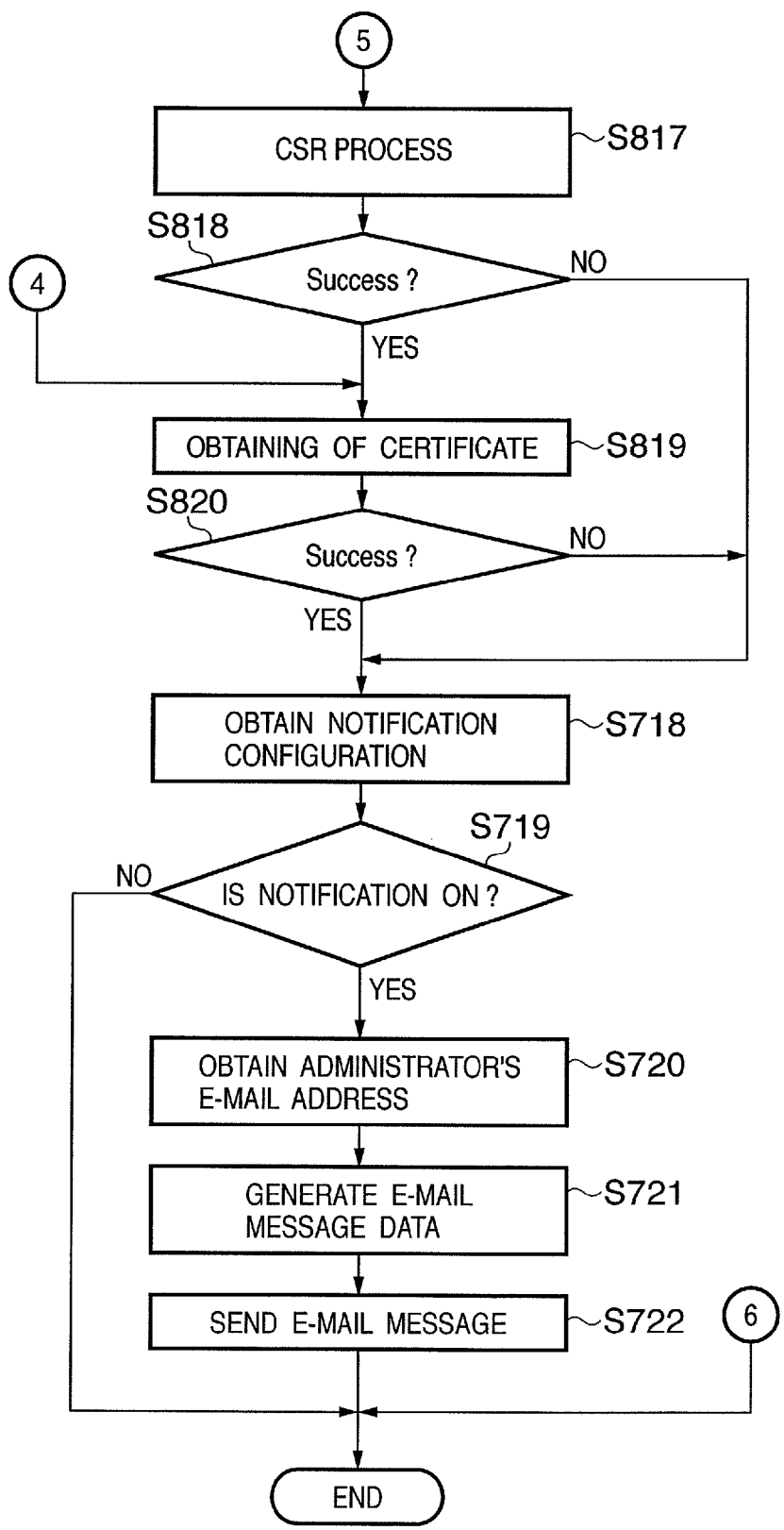
Figure 9A:
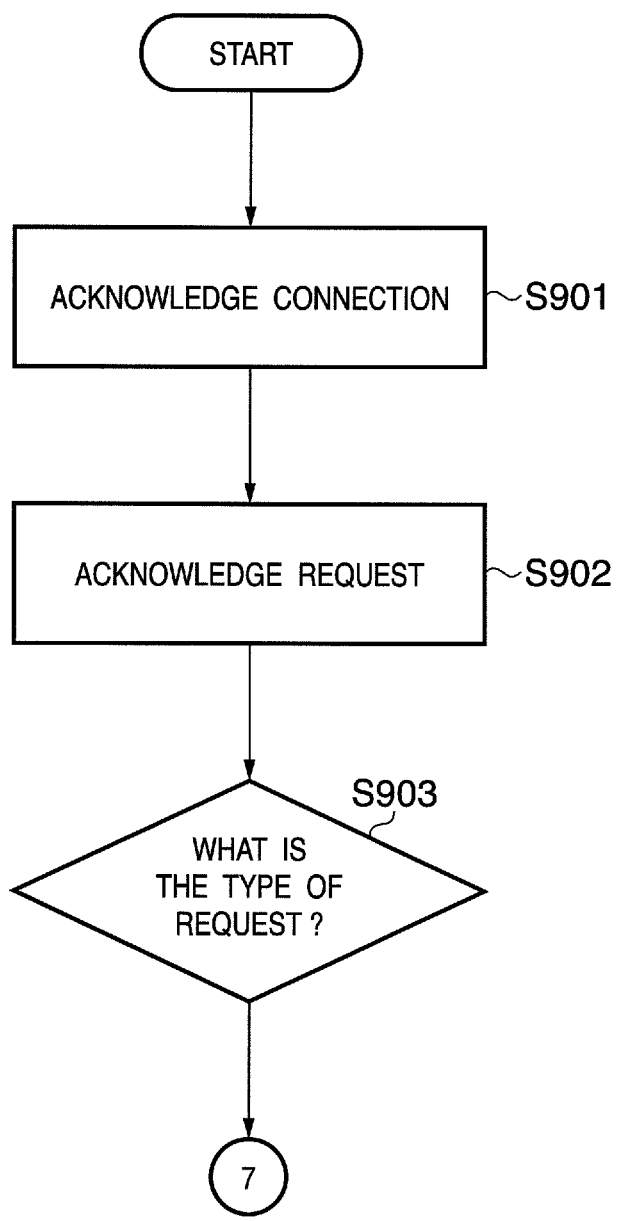
FIGS. 9A-E are flowcharts that depicts an example of CA service processing according to the first embodiment.
Figure 9B:
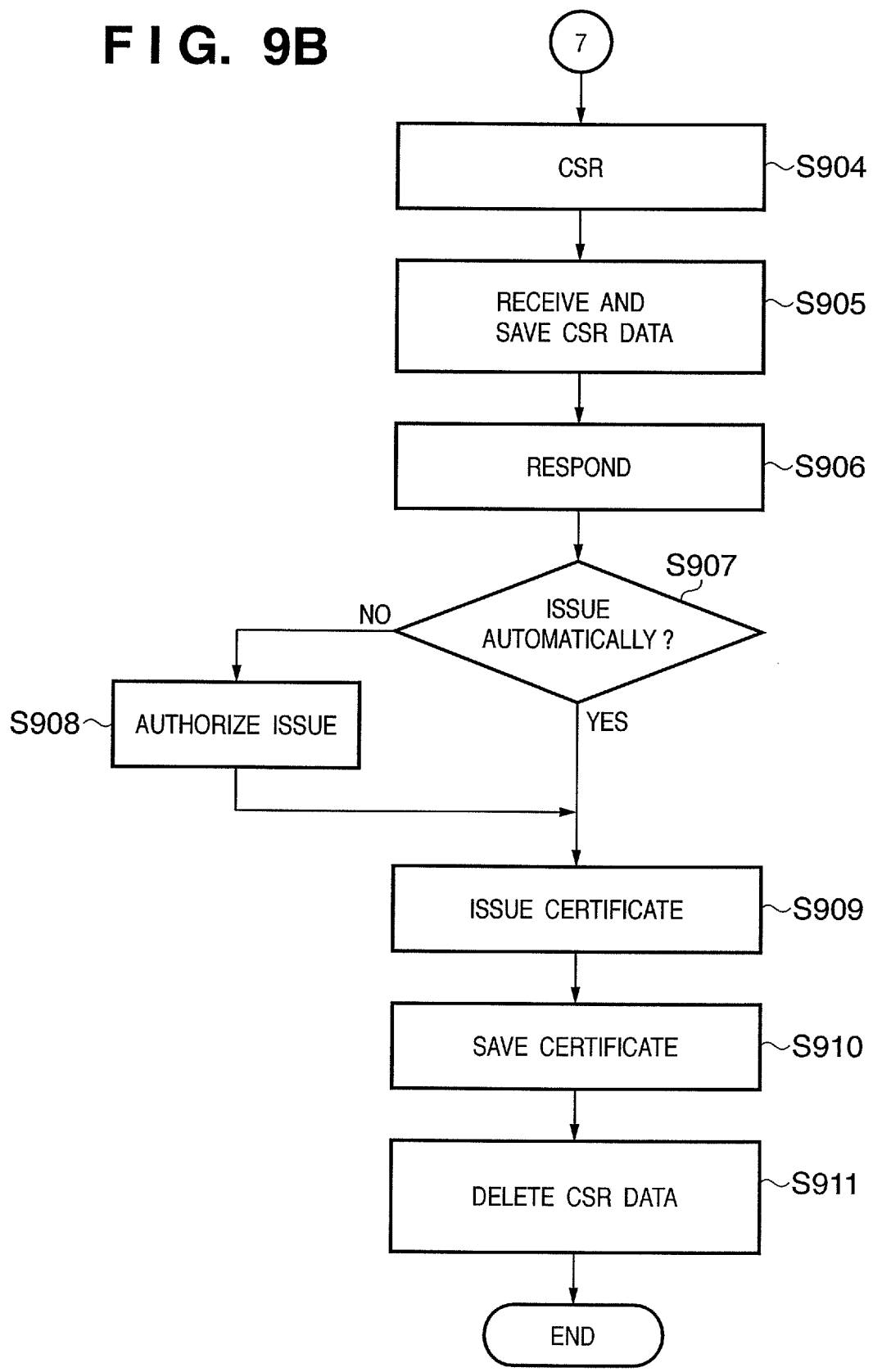
Figure 9C:
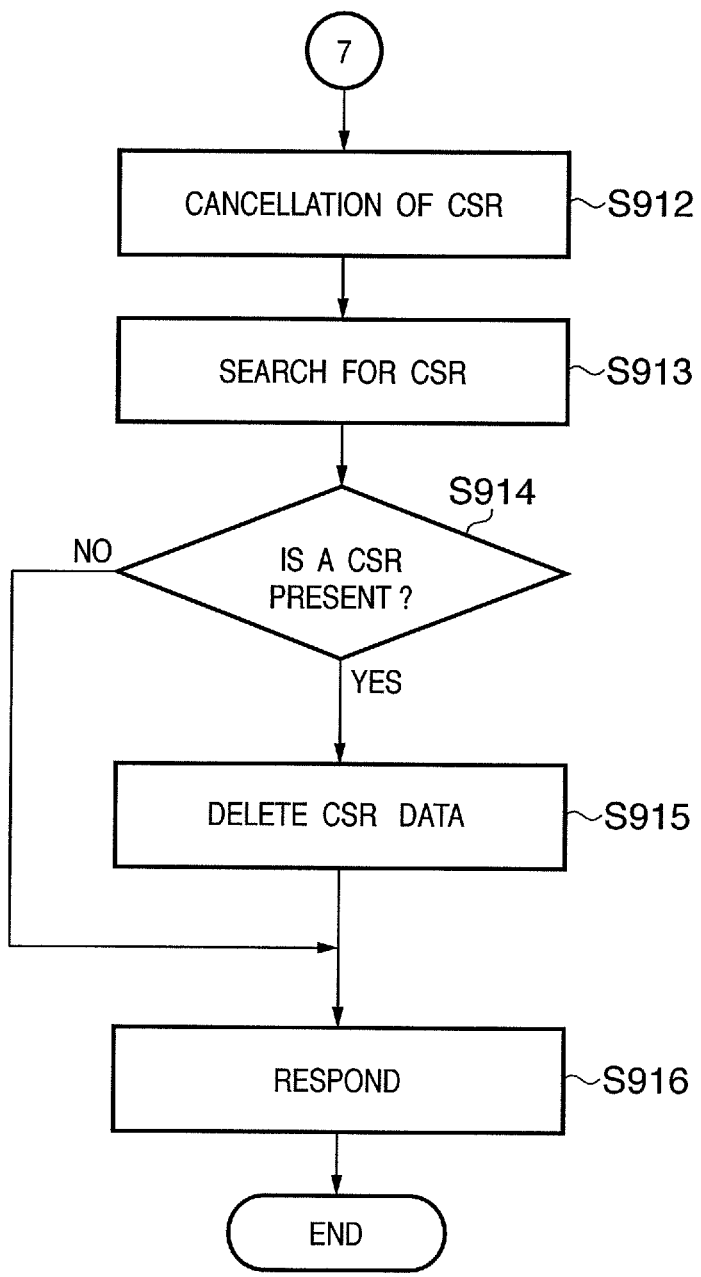
Figure 9D:
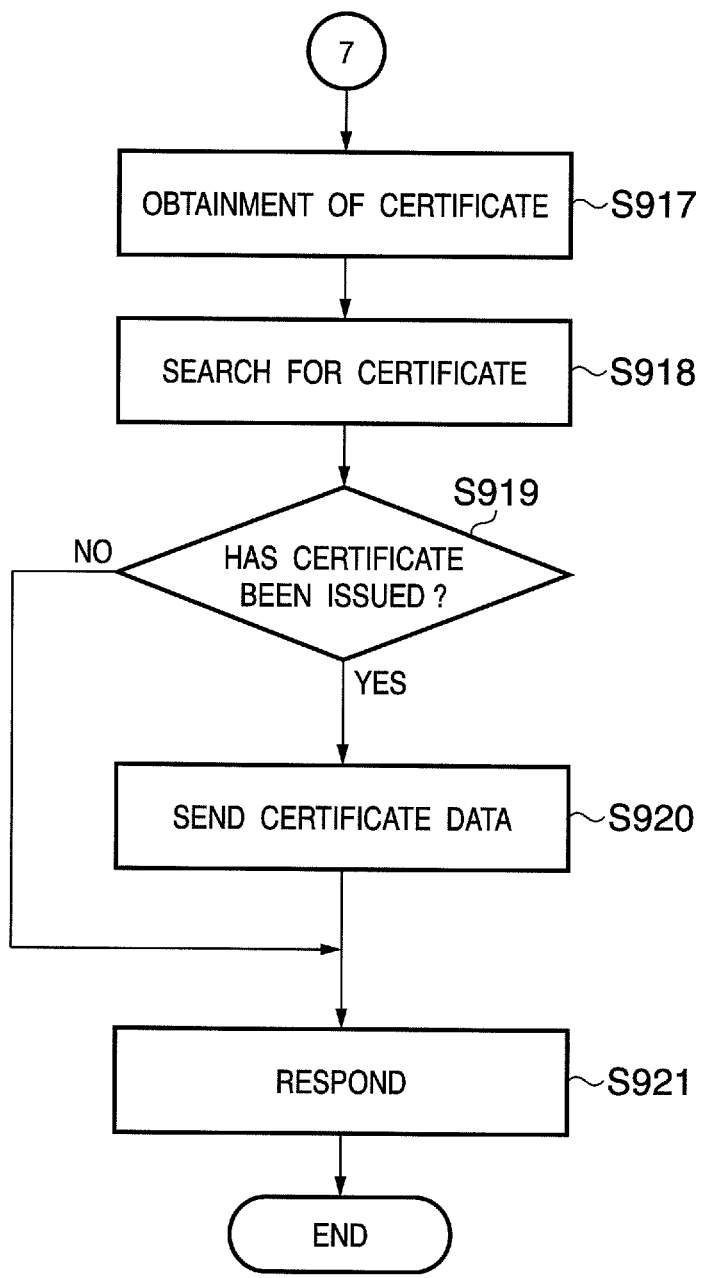
Figure 9E:
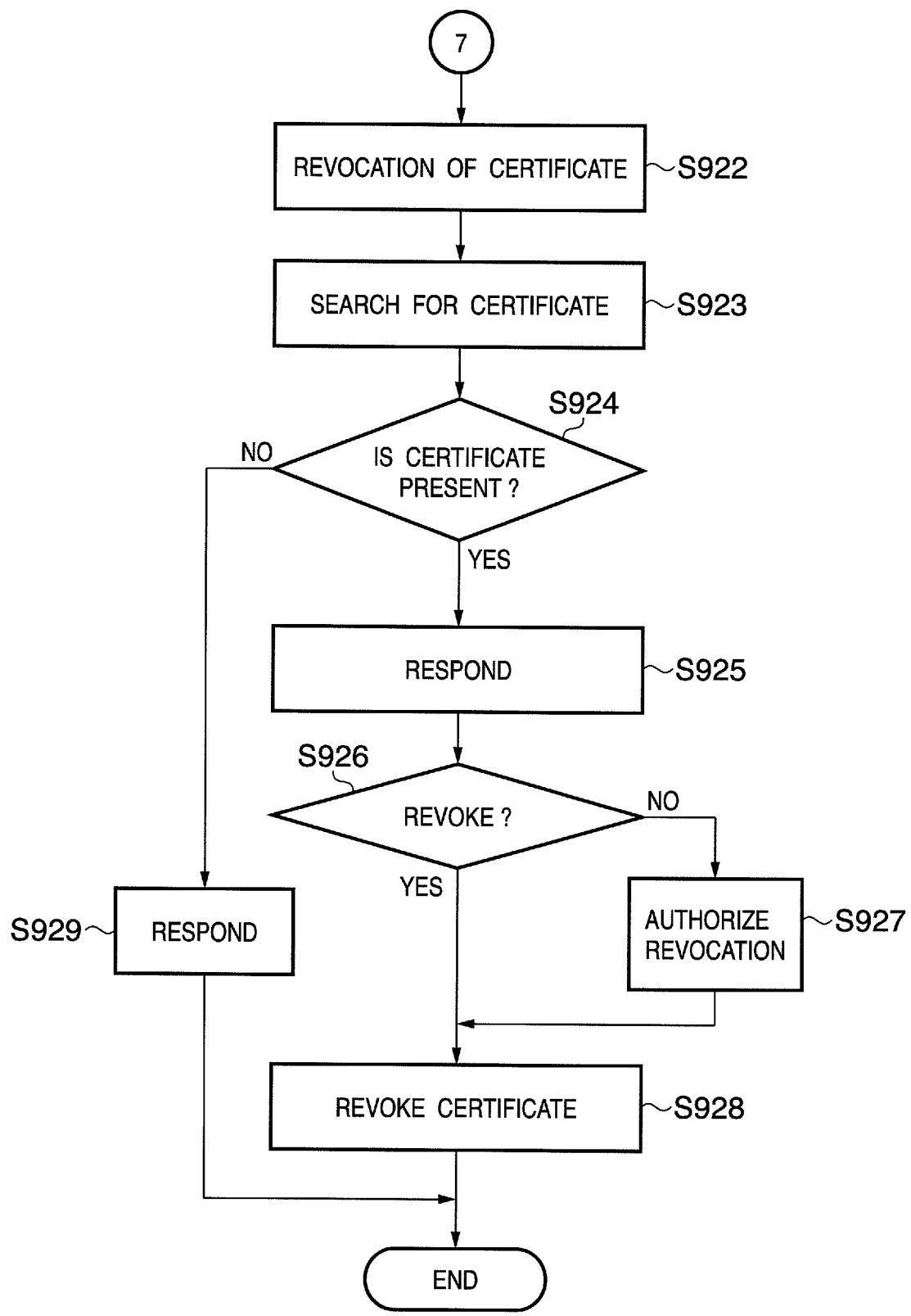

FIGS. 8A-B are flowcharts that depict a modified example of FIGS. 7A-B and that further depict an example of a process wherein an electronic certificate is updated. Processing steps that have the same content as processing steps in FIGS. 7A-B are marked with identical reference numbers, and descriptions are omitted, such that only processes that differ from those in FIGS. 7A-B are described herein. The differences between FIGS. 8A-B and FIGS. 7A-B are that steps S817-S820 are executed in place of step S717, and that the process proceeds to step S819 when a match is detected between the two hostnames in step S705, rather than ending.

After either the process of canceling a Certificate Signing Request (CSR) while the request is in progress, in steps S706-S708, or the process of revoking an electronic certificate, in steps S714-S716, is performed, a Certificate Signing Request process is performed again in order to obtain a new electronic certificate. This process is similar to the Certificate Signing Request process depicted in FIG. 5.

In step S818, if the Certificate Signing Request process was carried out properly in step S817, the process proceeds to step S819, and if the process was not carried out properly, the process proceeds to step S718. In step S819, acquisition of the requested electronic certificate is performed. This process is similar to the electronic certificate acquisition process depicted in FIG. 6.

Once it is determined in step S820 whether the Certificate Signing Request process was carried out properly or not, the process proceeds to step S718.

The process that follows is similar to that in steps S718-S722, except that the print device administrator is notified of an electronic certificate renewal in the event that the process in steps S817 and S819 is properly completed, and the print device electronic certificate is renewed. If, on the other hand, the process in steps S817 and S819 results in an error, the device administrator is notified of the error.

The processes involved in this variant example further automate the renewal of an electronic certificate.

FIGS. 9A-E are flowcharts that depicts an example of CA service processing that uses the server apparatus 120 to carry out the CA service processing, according to the embodiment.

The CA service acknowledges the various requests from the print device 110 via the network 100, and executes processes as follows according to the request.

After a connection from the print device 110 is acknowledged in step S901, a request or notification from the print device 110 is acknowledged in step S902, and the contents adjudicated in step S903.

If the request from the print device 110 is a Certificate Signing Request (CSR) in steps S903 and S904, the Certificate Signing Request (CSR) data is received, and saved in the CA service database, in step S905. A request acknowledgement response is returned in step S906.

According to the embodiment, the CA service possesses two operating modes vis-à-vis a Certificate Signing Request (CSR). The first operating mode is a mode that issues an electronic certificate automatically, in response to the Certificate Signing Request (CSR) without a server apparatus 120 administrator (server administrator) performing a verification. The second operating mode is a mode that issues an electronic certificate in response to a command from the server administrator, after the server administrator has verified the content of the Certificate Signing Request, or CSR. The server administrator is able to configure the CA service by selecting one of these modes.

If automatic issuing of an electronic certificate is allowed, that is, S907 is Yes, the process proceeds to step S909, and the electronic certificate is issued. In step S910, the issued electronic certificate is saved in the CA service database, the Certificate Signing Request (CSR) data that was saved in step S905 is deleted in step S911, and the process ends. If, on the other hand, automatic issuing of the electronic certificate is not allowed, that is, S907 is No, the process proceeds to step S908, and if the issuing of the electronic certificate is allowed following a verification on the part of the server administrator, steps S909-S911 are executed, and the process ends.

If it is determined in steps S903-S912 that the request from the print device 110 is a Certificate Signing Request cancellation notification, the process proceeds to step S913. In step S913, a search is performed for the Certificate Signing Request (CSR) data, based on the identification information for the Certificate Signing Request (CSR) that is contained within the cancellation notification. If the requisite Certificate Signing Request (CSR) data, is found, that is, step S914 is Yes, the requisite Certificate Signing Request (CSR) data, is canceled in step S915. A response is returned in step S916 that the result is that the Certificate Signing Request (CSR) data has been canceled, and the process ends. If the requisite Certificate Signing Request (CSR) data, is not found in step S913, that is, step S914 is No, then an error response is returned in step S916 that the result is that the requisite Certificate Signing Request (CSR) data does not exist, and the process ends.

If it is determined in steps S903-S917 that the request from the print device 110 is an electronic certificate acquisition request, the process proceeds to step S918. In step S918, after the requisite acquisition request is acknowledged, a search is performed for the Certificate Signing Request (CSR) data, based on the identification information for the electronic certificate that is contained within the acquisition request. If the requisite Certificate Signing Request (CSR) data is found in step S918, that is, step S919 is Yes, the requisite electronic certificate data is returned to the source of the request in step S920, and a response is returned in step S921 of the results. If the requisite electronic certificate data is not found in step S918, that is, step S919 is No, then an error response is returned in step S921 that the result is that the requisite electronic certificate data does not exist, and the process ends.

If it is determined in steps S903-S922 that the request from the print device 110 is an electronic certificate revocation request, the process proceeds to step S923. In step S923, a search is performed for the electronic certificate subject to revocation, based on the identification information for the electronic certificate that is contained within the notification. If the requisite electronic certificate is found in step S923, that is, step S924 is Yes, a revocation acknowledgement response is returned in step S925. If the requisite electronic certificate is not found in step S923, that is, step S924 is No, then an error response is returned in step S929 that the revocation could not be acknowledged.

According to the embodiment, the CA service possesses two operating modes vis-à-vis an electronic certificate revocation notification. The first operating mode is a mode that revokes an electronic certificate automatically, in response to the electronic certificate revocation notification, without the server administrator performing a verification. The second operating mode is a mode that revokes an electronic certificate in response to a command from the server administrator, after the server administrator has verified the content of the electronic certificate revocation notification. The server administrator is able to configure the CA service by selecting one of these modes.

If automatic revocation of an electronic certificate is allowed, that is, S926 is Yes, the process proceeds to step S928, and an electronic certificate revocation process is performed. To put it more concretely, according to the embodiment, a Certificate Revocation List, or CRL, is maintained in the CA service database, and an electronic certificate is revoked by adding the requisite electronic certificate to the Certificate Revocation List, or CRL.

If, on the other hand, automatic electronic certificate revocation is not allowed, that is, S926 is No, the process proceeds to step S927, and if the electronic certificate revocation is allowed following a verification on the part of the server administrator, step S928 is executed, and the process ends.

According to the embodiment, the print device administrator will be able to detect a mismatch between the identification information allocated to the print device and the identification information contained within the electronic certificate that is either being requested for issue or being maintained, even if the identification information allocated to the print device has been changed. It becomes possible to perform electronic certificate administration and operation by automatic issuing or renewal of an electronic certificate that is maintained by a device, without requiring such complicated time and trouble as that which would be connected with the issuing or renewal of the electronic certificate.

The assembly of the printing device 110, for the purpose of resolving these problems, is not restricted to the present embodiment. The following embodiments depict variations on the printing device 110. Concrete descriptions of the server apparatus 120 CA service processes are omitted, as processes fundamentally similar to those described in the preceding sections are applicable hereinafter.

Second Embodiment

According to the embodiment, the printing device 110 is constituted such that a Certificate Signing Request (CSR) is not capable of changing the printing device 110's identification information.

Figure 11:
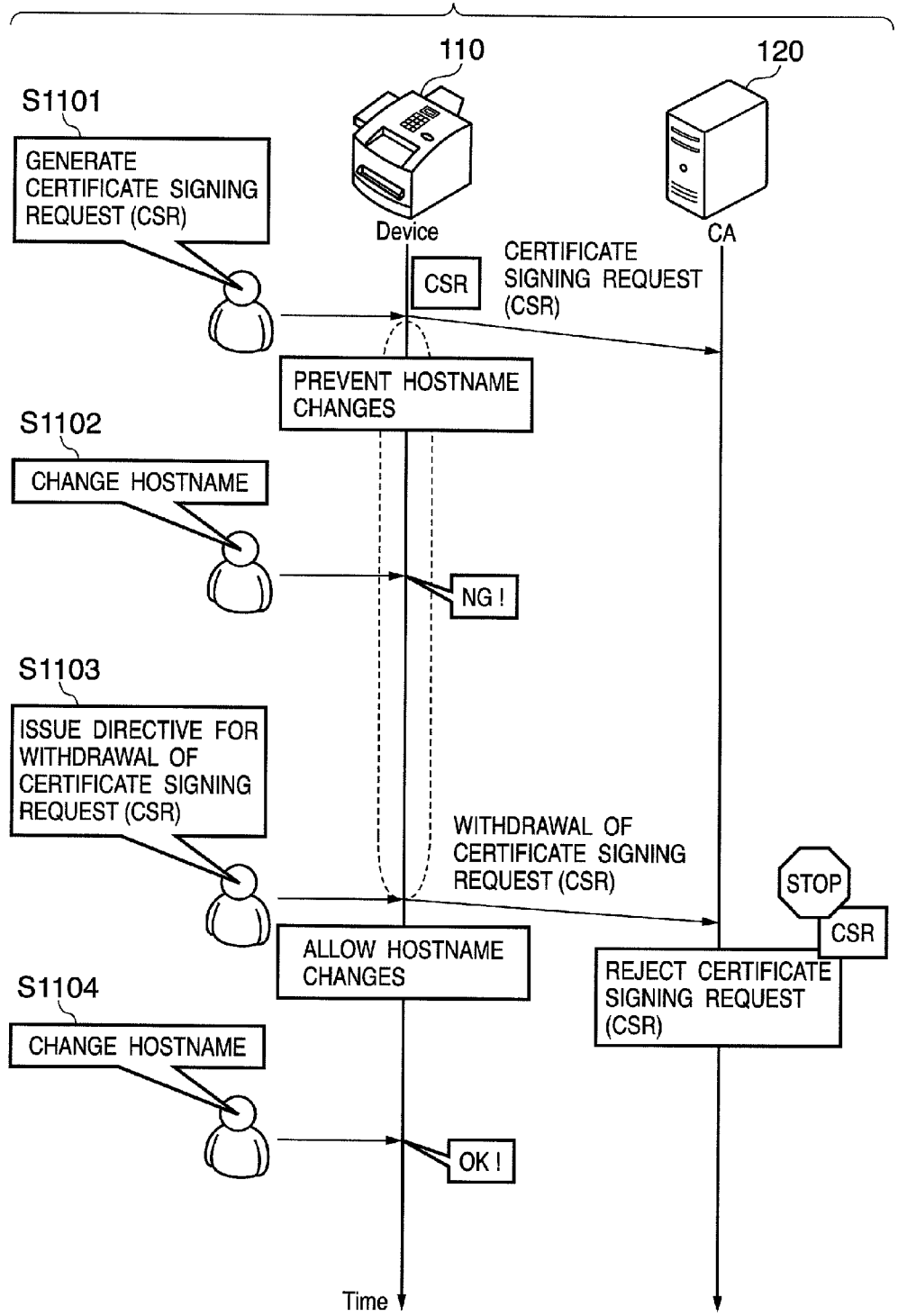
FIG. 11 is a flowchart that depicts an example of operation of an electronic certificate according to the second embodiment.

FIG. 11 is a flowchart that depicts an example of operation of an electronic certificate according to the embodiment.

In step S1101, user command or other operation performs the Certificate Signing Request (CSR) using the processes depicted in FIG. 5. As the printing device 110's identification information cannot be changed while the Certificate Signing Request (CSR) is being requested, any attempt to change the printing device 110's identification information, by a user via the printing device 110's user interface 210 or other path, will result in an error, and the printing device 110's identification information cannot be changed.

When changing the printing device 110's identification information, a Certificate Signing Request cancellation process is performed in step S1103, after which the printing device 110's identification information change process is performed in step S1104.

Figure 12:
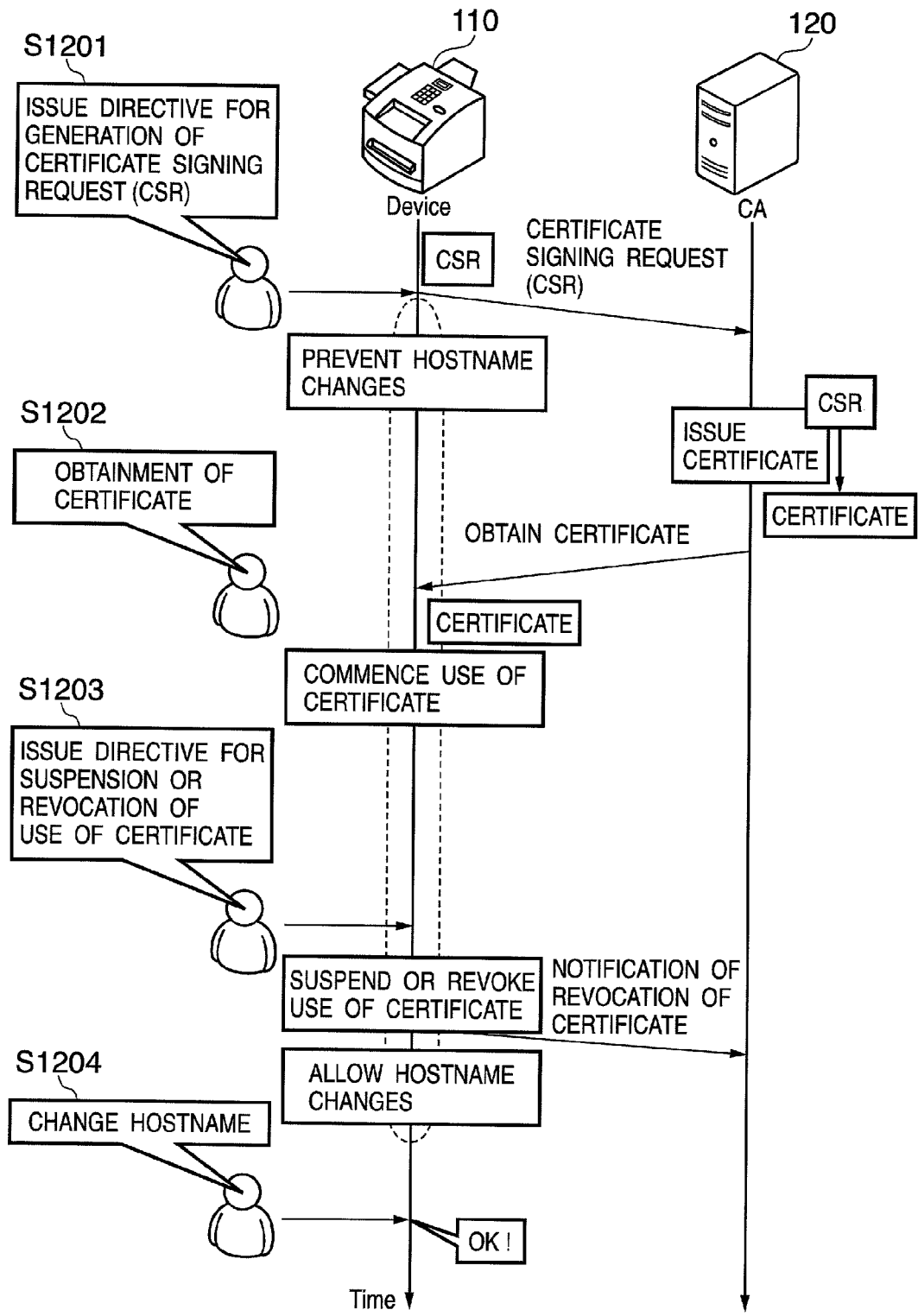
FIG. 12 is a flowchart that depicts a variant example of FIG. 11.

FIG. 12 is a flowchart that depicts a variant example of FIG. 11.

In step S1201, user command or other operation performs the Certificate Signing Request (CSR) using the processes depicted in FIG. 5. The electronic certificate acquisition depicted in FIG. 6 is performed, and use of the acquired electronic certificate commences, in step S1202. During the interval between requesting the electronic certificate and obtaining the electronic certificate, as well as the interval between that and using the issued electronic certificate, the printing device 110's identification information cannot be changed.

When changing the printing device 110's identification information, a Certificate Signing Request (CSR) usage suspension or revocation process is performed in step S1203, after which the printing device 110's identification information change process is performed in step S1204.

While not disclosed in the embodiment, it is possible to perform processes similar to those described in the embodiment even if the printing device itself issues and maintains a self-signed certificate that issues a certificate to itself, without having a remote CA service perform issuing of an electronic certificate.

According to the embodiment, changing the printing device 110's identification information in steps S1102, S1104, or S1204 is performed by operating the user interface 210, as depicted in FIG. 10.

FIG. 13 is a diagram depicting an example of a user interface touchscreen when altering the printing device 110's identification information. As depicted in the figure, it is possible to configure from the user interface such elements of the printing device 110's identification information as the IP address 901 or the hostname 904. According to the embodiment, it is possible to perform such configurations as the subnet mask 902, the default gate web address 903, or the configurations 905, which pertain to automatic acquisition the IP address via DHCP, as the printing device network configurations, aside from the preceding configurations.

Figure 14:
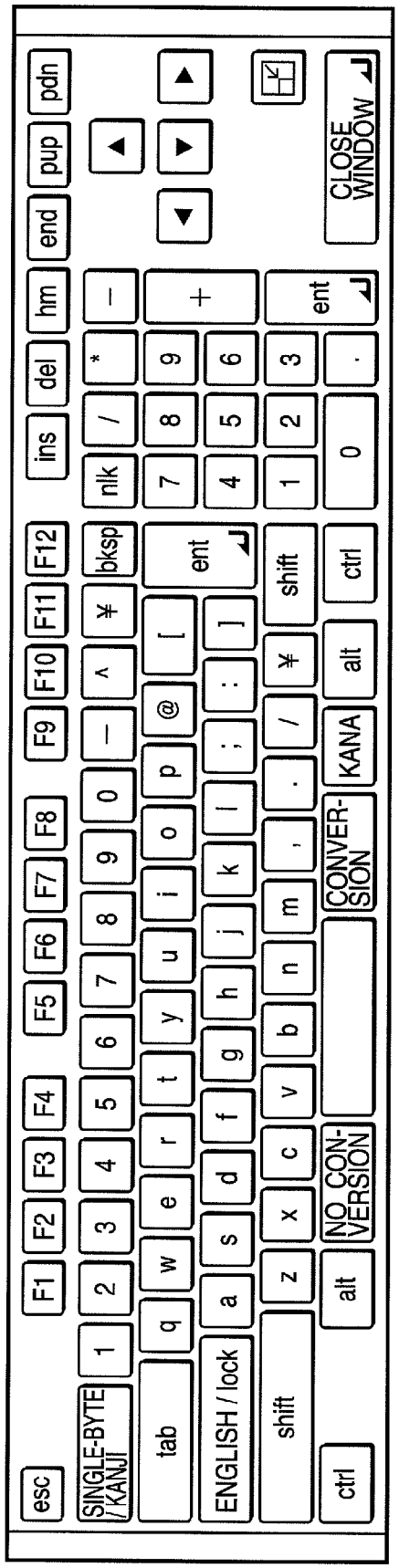
FIG. 14 is a diagram depicting an example of a software keyboard display according to the embodiment.

When inputting the printing device configuration values, pressing the input space 906 for the various configurations causes a software keyboard to be displayed such as that depicted in FIG. 14, which allows inputting such characters as alphanumeric characters, at will. Input is also possible via a ten-key pad 2102 as depicted in FIG. 10, without using the software keyboard.

The printing device's identification information may be configured by way of the preceding method.

Figure 15:
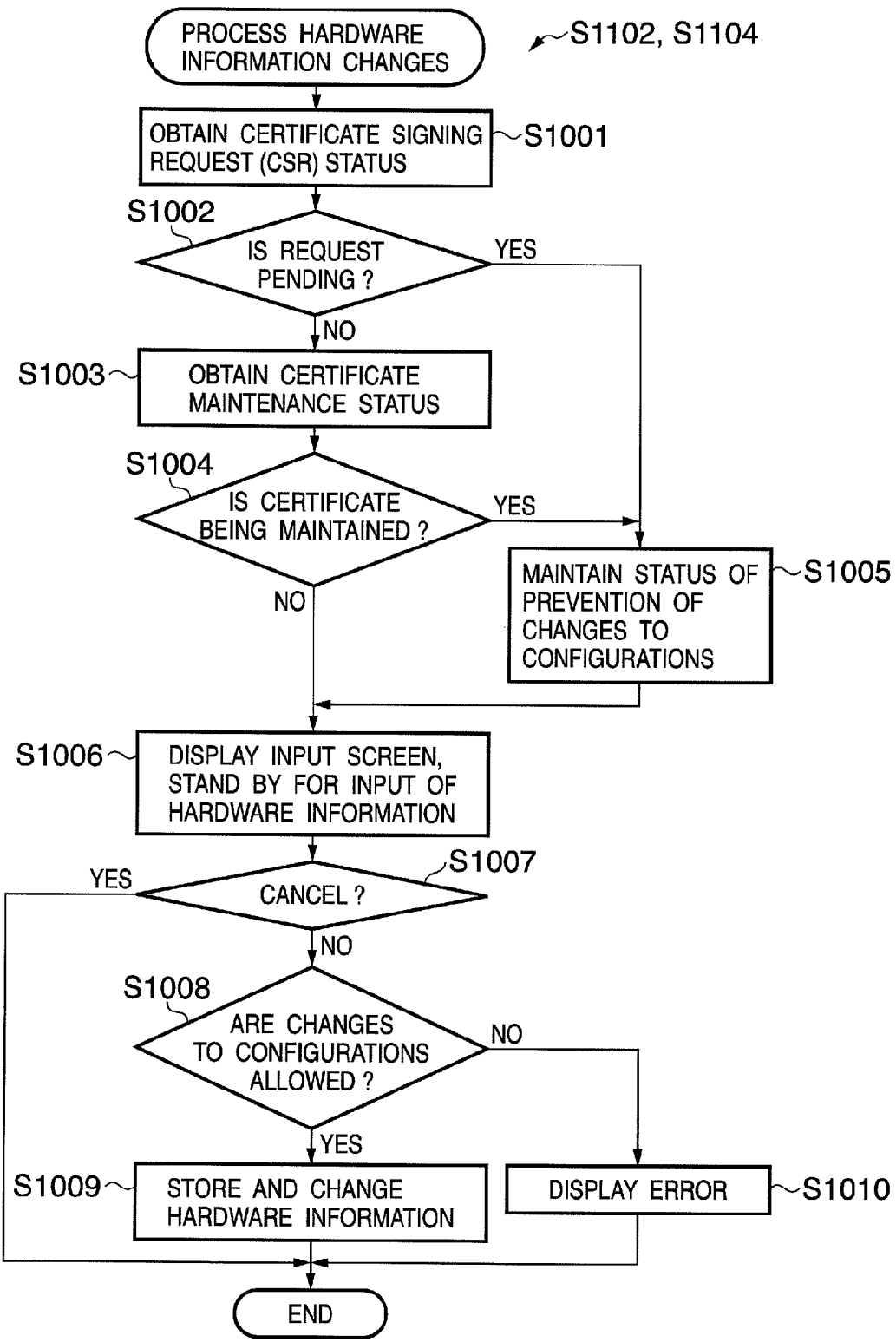
FIG. 15 is a flowchart that depicts an example of printing device identification information alteration processing according to the second embodiment.

FIG. 15 is a flowchart that depicts an example of printing device identification information alteration processing, as depicted in FIG. 11, steps S1102 and S1104. The identification information alteration process commences when user interface display operations are performed in order for the user to alter the printing device identification information.

In step S1001, the printing device 110 obtains the Certificate Signing Request (CSR) status as configured in FIG. 5, step S509. If the Certificate Signing Request (CSR) status that was obtained in step S1001 is valid in step S1002, that is, if an electronic certificate is being requested for issue, the process proceeds to step S1005. If, on the other hand, it is determined that the Certificate Signing Request (CSR) status is invalid, that is, if an electronic certificate is not being requested for issue, the process proceeds to step S1003.

In step S1003, the printing device 110 obtains the electronic certificate maintenance status configured in FIG. 6, step S609. If the electronic certificate maintenance status that was obtained in step S1003 is valid in step S1004, that is, if an electronic certificate is already being maintained, the process proceeds to step S1005. If, on the other hand, it is determined that the electronic certificate maintenance status is invalid, that is, if an electronic certificate is not being maintained, the process proceeds to step S1006.

In step S1005, the identification information status for preventing alteration is configured and maintained, the process proceeds to step S1006.

Figure 17:
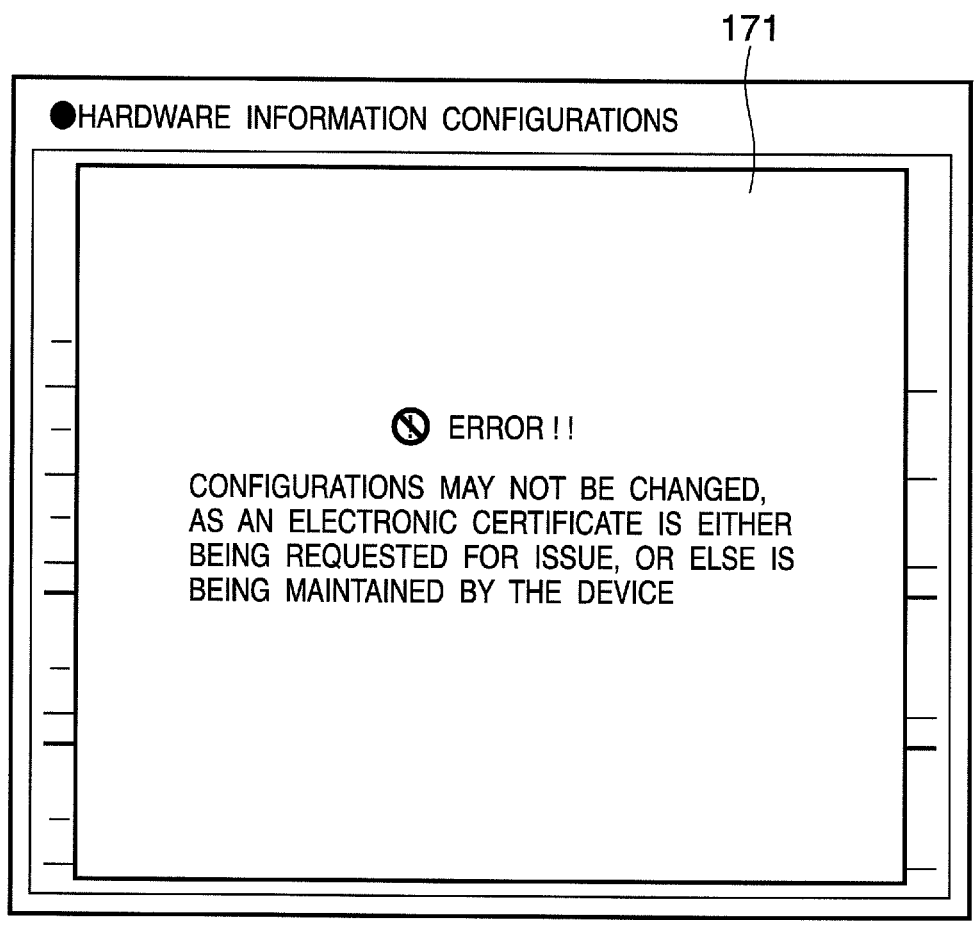

In step S1006, an identification information alteration screen such as that depicted in FIG. 13 is displayed, which waits for the user to perform input of identification information alteration data via user interface operations. Once the input is performed in step S1006, the process ends if it is determined in step S1007 that the cancel button depicted in FIG. 14 has been pressed. If, on the other hand, an input other than the cancel button is performed, the process proceeds to step S1008, where a determination is performed as to whether or not the identification information is subject to alteration, according to the identification information status for preventing alteration configured in step S1005. If it is determined in step S1008 that the host identification information may be altered, the process proceeds to step S1009, wherein the inputted host identification information is stored, the information configured as its own configuration values, and the process ends. If it is determined in step S1008 that the host identification information may not be altered, then, for example, an error message 171, such as that depicted in FIG. 17, is displayed on the identification information configuration screen in step S1010, and the process ends. It is also permissible to display an error message 181, such as that depicted in FIG. 18, in place of FIG. 17, error message 171.

It is presumed that if the cancel button C depicted in FIG. 10 is pressed when any of the screens is displayed, the process will return to the copy standby screen depicted in FIG. 10, or other screen.

Figure 16:
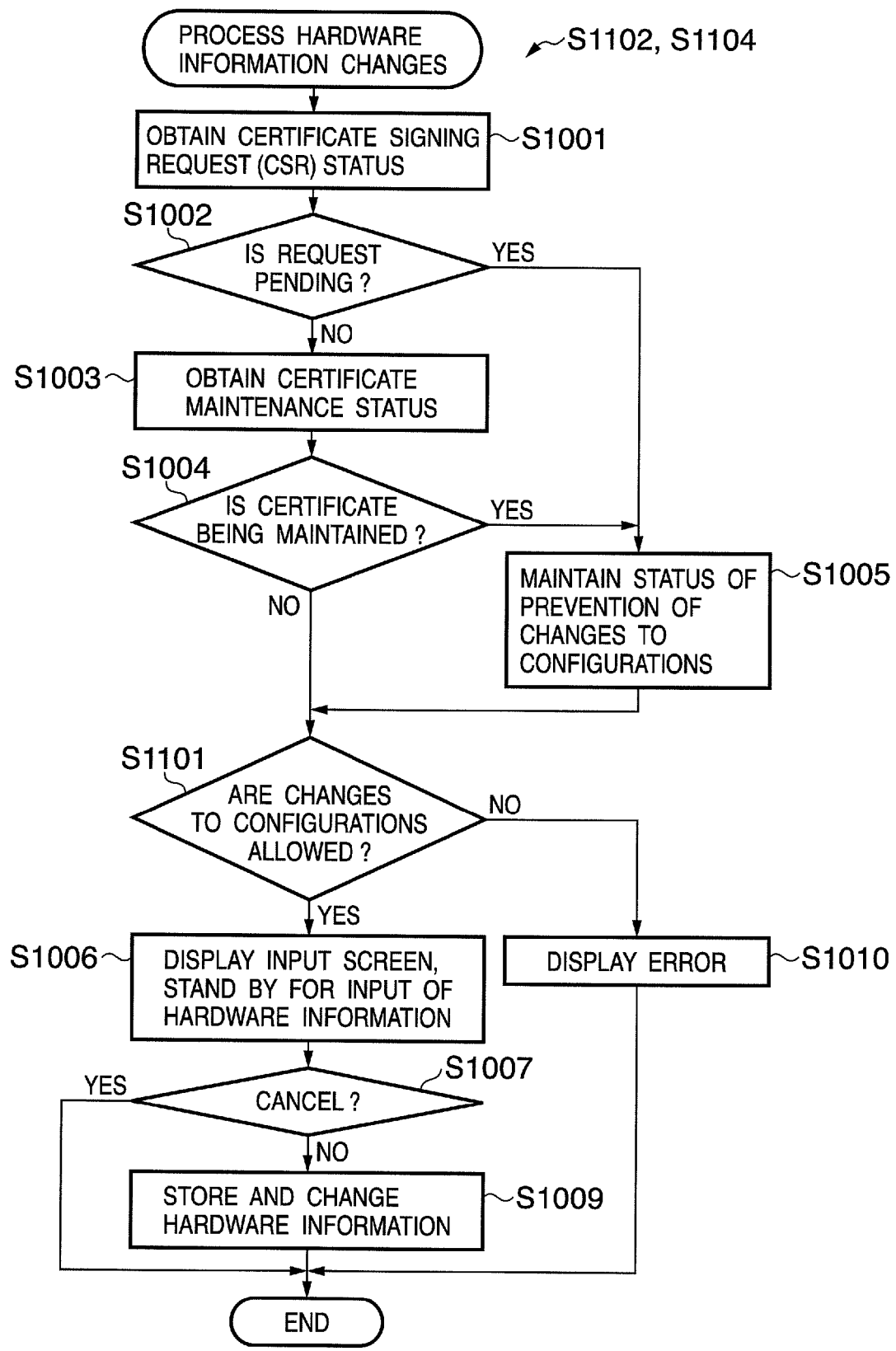
FIG. 16 is a flowchart that depicts a variant example of printing device identification information alteration processing according to the second embodiment.

FIG. 16 is a flowchart that depicts a variant example of the flow depicted in FIG. 15. The example in FIG. 15 displayed the identification information alteration screen in step S1006, and performed a determination in step S1008 of whether the identification information is subject to alteration or not, if an input other than the cancel button was performed. It is also permissible, however, to perform the determination of whether the identification information is subject to alteration or not prior to the display of the identification information alteration screen. In more concrete terms, the determination of whether the identification information is subject to alteration or not is performed in step S1101, prior to step S1006, such as depicted in FIG. 16. If it is determined that the host identification information may not be altered, the process proceeds to step S1010, wherein an error message 171, such as that depicted in FIG. 17, or an error message 181, such as that depicted in FIG. 18, is displayed on the identification information configuration screen, and the process ends. It is presumed that no configurations may be altered while the error message is being displayed.

Figure 19:
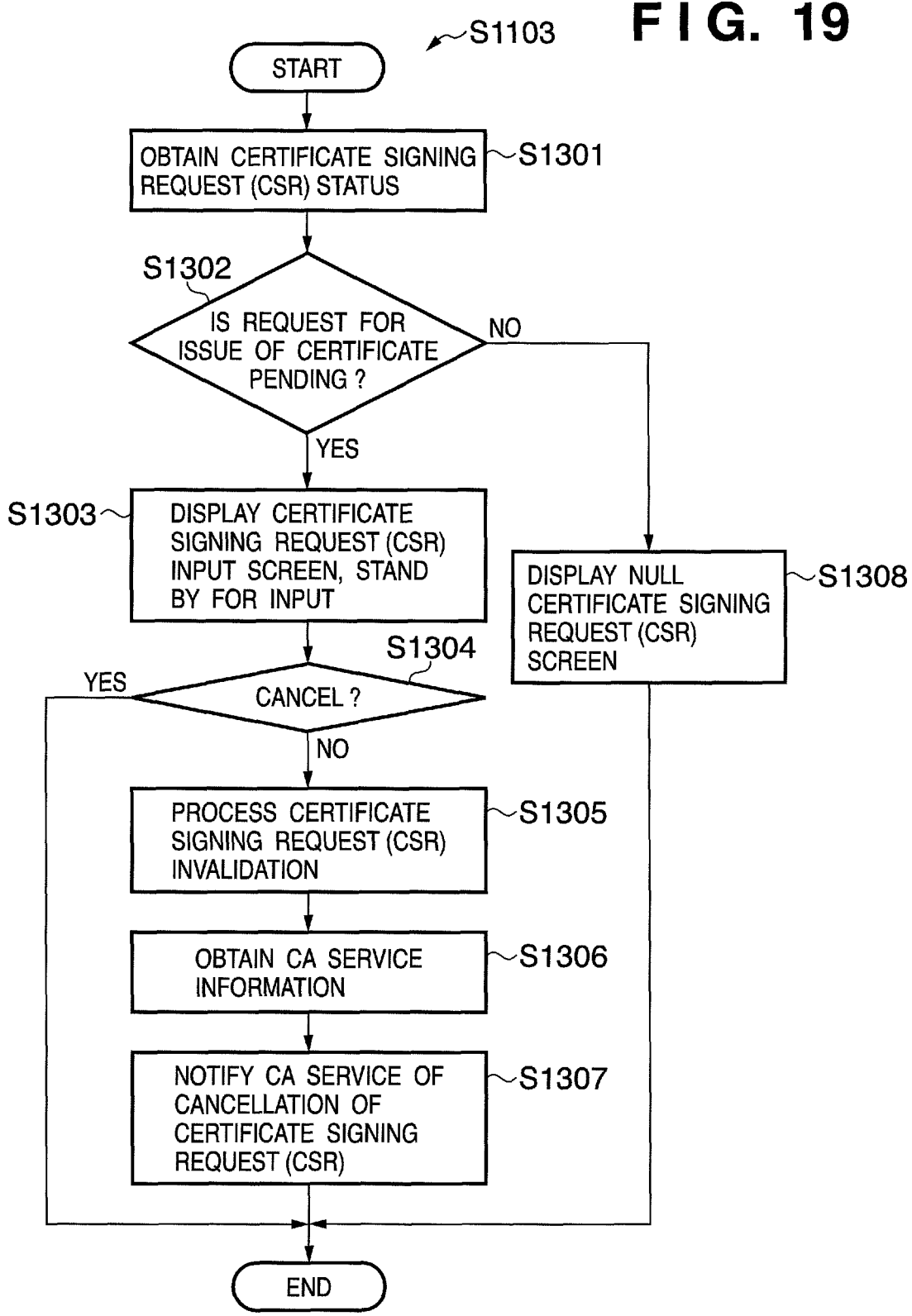
FIG. 19 is a flowchart that depicts an example of printing device Certificate Signing Request suspension processing according to the second embodiment.

FIG. 19 is a flowchart that depicts an example of the printing device 110 Certificate Signing Request suspension processing as depicted in FIG. 11, step S1103. The process commences when the user performs an operation in order to perform a Certificate Signing Request cancellation for the printing device 110.

In step S1301, the printing device 110 obtains the Certificate Signing Request status that was configured in FIG. 5, step S509. If the Certificate Signing Request status that was obtained in step S1301 is valid in step S1302, that is, an electronic certificate is being requested for issue, the process proceeds to step S1303. If, on the other hand, the Certificate Signing Request status is not valid, that is, an electronic certificate is not being requested for issue, the process proceeds to step S1308, and, for example, after performing a screen display such as that depicted in FIG. 20, the process ends.

Figure 21:
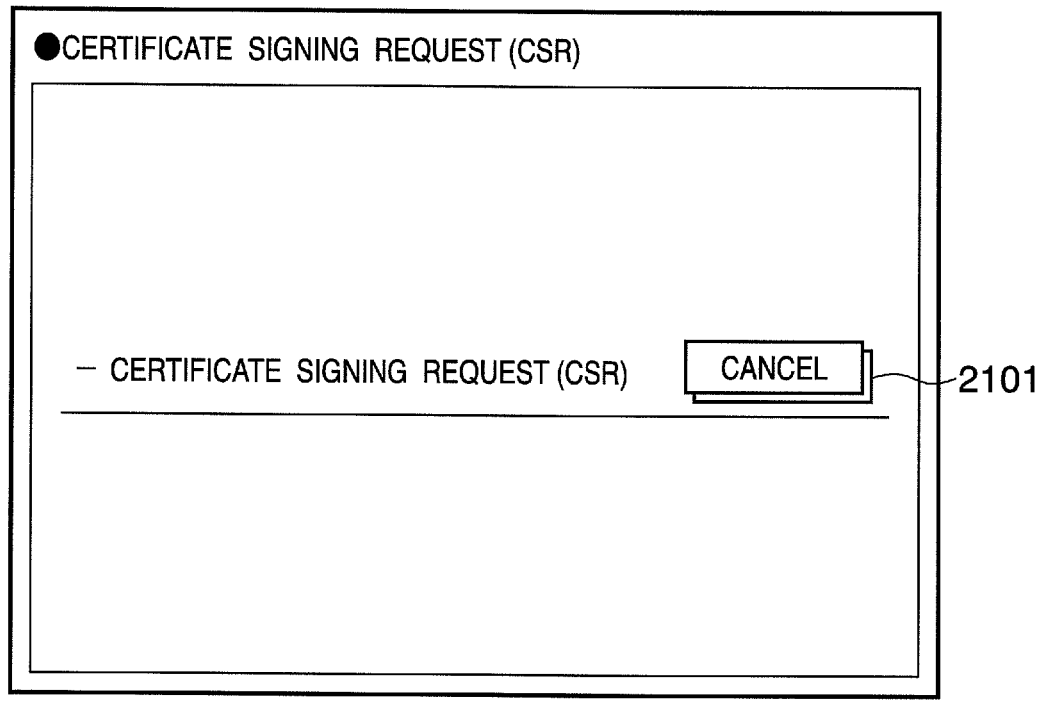
FIG. 21 is a diagram depicting an example of a Certificate Signing Request cancellation screen according to the second embodiment.

In step S1303, a Certificate Signing Request cancellation screen, such as that depicted in FIG. 21, is displayed, and the device waits for the cancellation button 2101 to be pressed. When the cancellation button 2101 is pressed, the process proceeds to step S1304. In step S1304, a decision is made as to whether or not the cancel button has been pressed, as depicted in FIG. 10. If the cancel button has been pressed, the process ends. If an input other than the cancel button has been performed, the process proceeds to step S1305.

In step S1305, an invalidation of the Certificate Signing Request status and a deletion of the Certificate Signing Request (CSR) data is performed, as a Certificate Signing Request cancellation. The process then proceeds to step S1306, wherein the CA service information is obtained, after which a Certificate Signing Request cancellation notice is issued to the CA service in step S1307, and the process ends.

Figure 22:
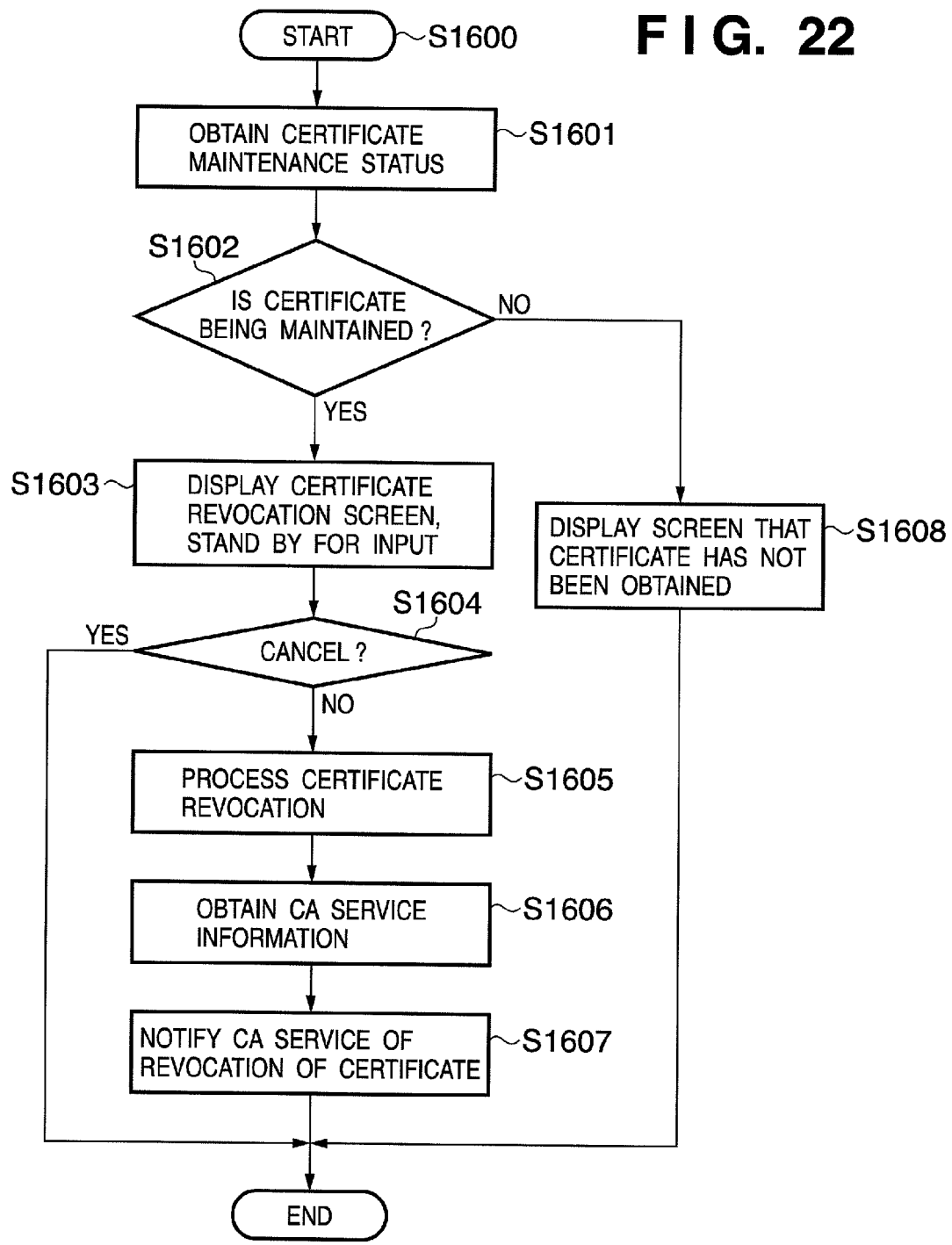
FIG. 22 is a flowchart that depicts an example of printing device electronic certificate suspension or revocation processing according to the second embodiment.

FIG. 22 is a flowchart that depicts an example of the printing device 110 electronic certificate suspension or revocation processing, as depicted in FIG. 12, step S1203. The printing device 110 electronic certificate suspension or revocation processing is, for example, commenced in response to the prescribed input in the user interface 210, according to the embodiment.

Figure 23:
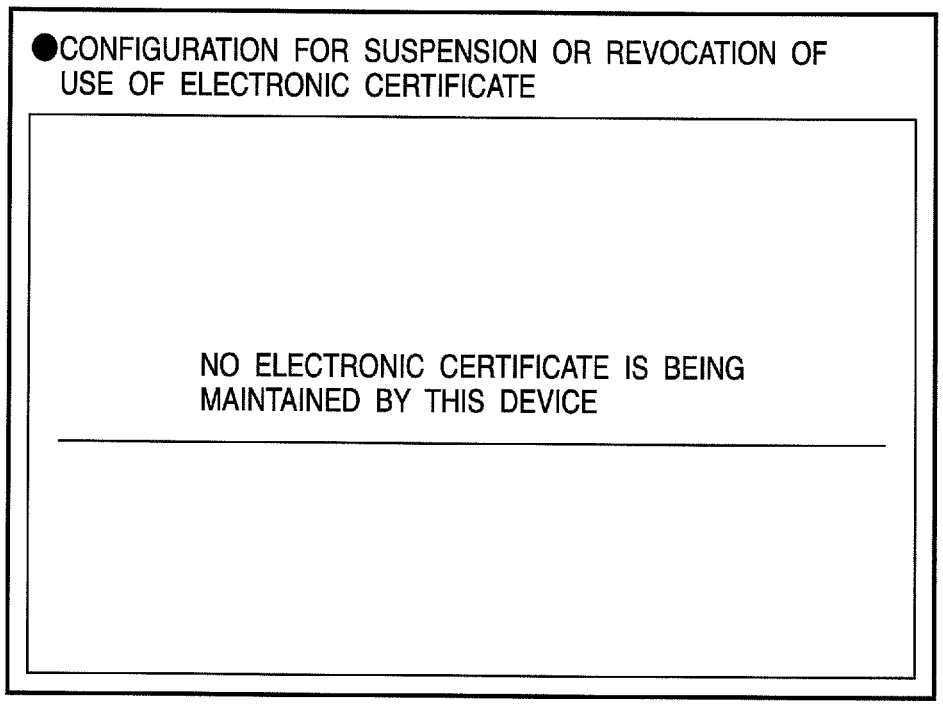
FIG. 23 is a diagram depicting an example of an error screen for electronic certificate suspension or revocation operations according to the second embodiment.

In step S1601, the printing device 110 obtains the electronic certificate maintenance status that was configured in FIG. 6, step S609. If the electronic certificate maintenance status that was obtained in step S1601 is valid in step S1602, that is, the printing device 110 is maintaining the electronic certificate, the process proceeds to step S1603. If, on the other hand, the electronic certificate maintenance status is not valid, that is, the printing device 110 is not maintaining the electronic certificate, the process proceeds to step S1608, and, for example, after performing a screen display such as that depicted in FIG. 23, the process ends. It is presumed that, if the cancel button depicted in FIG. 10 is pressed while the screen is being displayed, the process will return to the copy standby screen, or other screen, as depicted in FIG. 10.

In step S1603, an electronic certificate suspension or revocation verification screen, such as that depicted in FIG. 24, is displayed, and the process proceeds to step S1604 when the execute button 2401 is pressed. In step S1604, a decision is made as to whether or not the cancel button has been pressed, as depicted in FIG. 10. If the cancel button has been pressed, the process ends. If an input other than the cancel button has been performed, the process proceeds to step S1605.

In step S1605, an invalidation of the electronic certificate maintenance status and a deletion of the electronic certificate data is performed, as an electronic certificate suspension or revocation configuration process. If an application is using the electronic certificate, the application service is suspended, etc., and the process proceeds to step S1606, wherein the CA service information is obtained, after which an electronic certificate revocation notice is issued to the CA service in step S1307. Thus, the electronic certificate is revoked, and the process ends.

According to the second embodiment, it is possible to avoid a mismatch in the hostname or other identification information of information processing apparatus that is the printing device 110, and the identification information of the printing device that is contained in the device's electronic certificate, whether while the electronic certificate is being requested for issue, or while the electronic certificate is being maintained. Consequently, maintenance of an illicit electronic certificate by the printing device is eliminated, thus allowing both proper verification of a printing device, using an electronic certificate, as well as ensuring security in communication with the printing device.

Third Embodiment

Processing when in an environment wherein the printing device 110's host identification information changes dynamically will be described according to the embodiment.

According to the embodiment, upon activation of the printing device 110, a dynamic allocation of an IP address that constitutes the host identification information of the printing device 110 is performed by a DHCP server (not shown in FIG. 1). According to the embodiment, it is possible to perform a configuration as to whether or not to perform the dynamic allocation of the IP address via DHCP for the printing device 110 by selecting a DHCP configuration 905, as depicted in FIG. 13. In other words, the DHCP configuration 905 is valid according to the embodiment.

Figure 25:
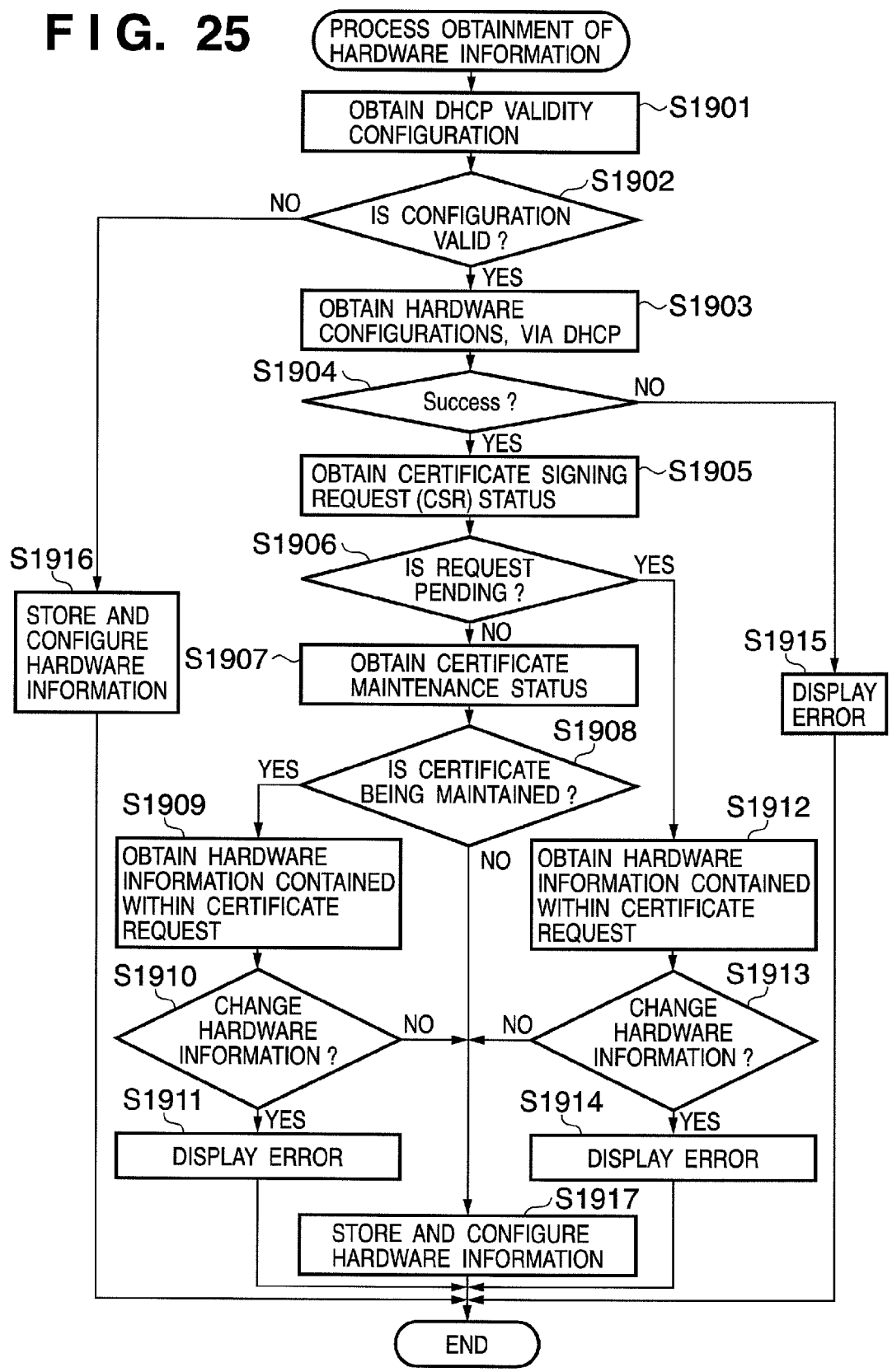
FIG. 25 is a flowchart that depicts an example of printing device processing according to the third embodiment.

FIG. 25 is a flowchart that depicts an example of printing device processing according to the embodiment.

Upon power being supplied, the printing device 110 obtains the DHCP validity configuration that is configured within itself, per step S1901. If it is determined in step S1902 that the configuration is valid, the process proceeds to step S1903.

If it is determined in step S1902 that the configuration is invalid, the process proceeds to step S1916, wherein a pre-configured IP address or other hardware configuration is obtained, and is configured as the host identification information of the printing device 110 itself.

Figure 26:
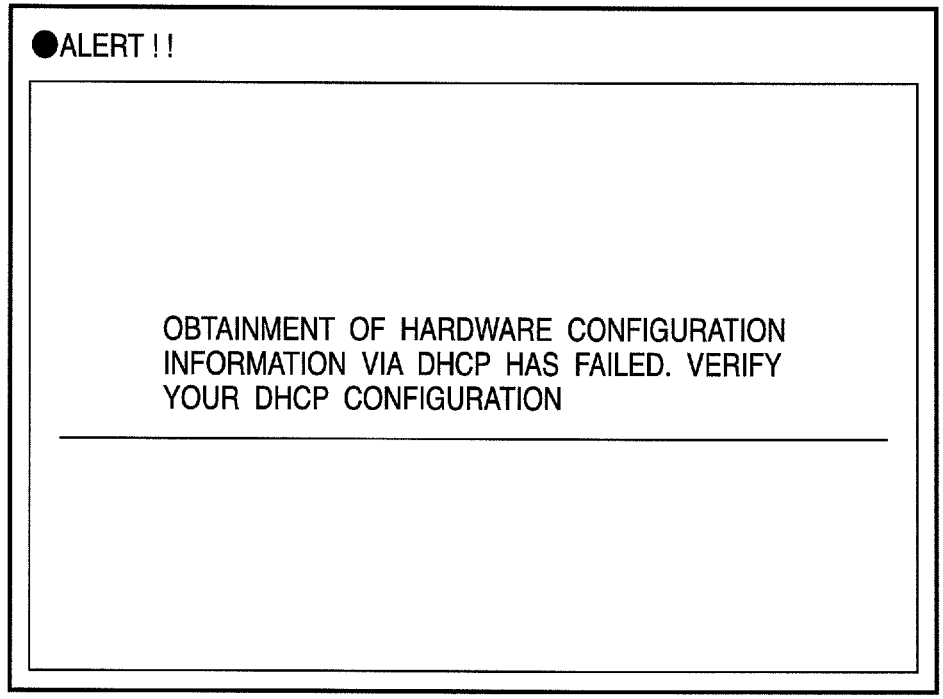
FIG. 26 is a diagram depicting an example of an error screen for device information acquisition via DHCP, according to the third embodiment.

In step S1903, acquisition of hardware configuration information via DHCP is performed. If it is determined in step S1904 that the process in step S1903 is successful, the process proceeds to step S1905, whereas if it is determined that the process in step S1903 fails, an error screen such as that depicted in FIG. 26 is displayed on the user interface in step S1915. It is presumed that, if the cancel button depicted in FIG. 10 is pressed while the screen is being displayed, the process will return to the copy standby screen, or other screen, as depicted in FIG. 10.

In step S1905, the Certificate Signing Request status that was configured in FIG. 5, step S509, is obtained. If the Certificate Signing Request status is valid in step S1906, that is, an electronic certificate is being requested for issue, the process proceeds to step S1912. If, on the other hand, the Certificate Signing Request status is not valid, that is, an electronic certificate is not being requested for issue, the process proceeds to step S1907.

In step S1912, the host identification information that is contained within the Certificate Signing Request (CSR) that is maintained by the printing device 110, is obtained. An assessment is made in step S1913 as to whether or not the hardware configuration information that was obtained in step S1903 matches the hardware configuration information that was obtained in step S1912.

If it is determined in step S1913 that the respective hardware information matches, the process proceeds to step S1917, wherein the hardware configuration information that was obtained in step S1903 is configured as the host identification information of the printing device 110 itself, and the process ends.

If, on the other hand, it is determined in step S1913 that the respective hardware information does not match, the process proceeds to step S1914, wherein an error screen such as that depicted in FIG. 27 is displayed on the user interface, and the process ends.

Meanwhile, in step S1907, the electronic certificate maintenance status that was configured in FIG. 6, step S609 is obtained. If the electronic certificate maintenance status that was obtained in step S1907 is valid in step S1908, that is, the printing device 110 is maintaining the electronic certificate, the process proceeds to step S1909. If, on the other hand, the electronic certificate maintenance status is not valid, that is, the printing device 110 is not maintaining the electronic certificate, the process proceeds to step S1917. In step S1917, the hardware configuration information that was obtained in step S1903 is configured as the host identification information of the printing device 110 itself, and the process ends.

In step S1909, the host identification information that is contained within the electronic certificate that is maintained by the printing device 110 is obtained. An assessment is made in step S1910 as to whether or not the hardware configuration information that was obtained in step S1903 matches the hardware configuration information that was obtained in step S1909. If it is determined herein that the respective hardware information matches, the process proceeds to step S1917, wherein the hardware configuration information that was obtained in step S1903 is configured as the host identification information of the printing device 110 itself, and the process ends. If, on the other hand, it is determined that the respective hardware information does not match, the process proceeds to step S1911, wherein an error screen such as that depicted in FIG. 27 is displayed on the user interface, and the process ends.

According to the third embodiment, it is possible to derive results similar to those achieved with regard to embodiments one and two even if the host identification information of the printing device 110 that is the information processing apparatus is in a dynamically changing environment.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-009092, filed Jan. 17, 2006, which is hereby incorporated by reference herein in its entirety.

What is claimed is:

1. An information processing apparatus that performs communication using an electronic certificate, comprising:
    a data storage system comprising a data storage device and storing at least a control program; and
    a data processing system comprising a CPU and coupled to the data storage system, the data processing system operative by the control program at least to:
    set identification information for identifying the information processing apparatus;
    change the identification information which has been set;
    store the set identification information in the data storage system;
    issue a first request for issue of the electronic certificate, containing the identification information stored in said data storage system, to a certificate authority;
    determine whether or not the identification information stored in said data storage system is changed to identification information different than that contained in the first request after the first request is issued to the certificate authority, and before an obtaining of the electronic certificate issued by the certificate authority in response to the first request;
    issue a notification indicating an error, said error caused due to a change of the identification information stored in said data storage system, the notification to be issued when it is determined that the identification information stored in said data storage system is changed to identification information different than that contained in the first request; and
    issue a second request for issue of a new electronic certificate, when it is determined that the identification information stored in said data storage system is changed to identification information different than that contained in the first request.

2. The information processing apparatus according to claim 1, wherein the data processing system is operative by the control program at least to:
    issue a third request for cancellation, of the first request, to the certificate authority, if it is determined that the identification information stored in said data storage system is changed to identification information different than that contained in the first request.

3. The information processing apparatus according to claim 2, wherein the data processing system is operative by the control program at least to issue the second request for issue of the new electronic certificate, following the issue of the third request.

4. A control method for an information processing apparatus having a storage unit configured to store identification information for identifying the information processing apparatus, comprising the steps of:
    setting the identification information, the set identification information being stored in the storage unit;
    changing the identification information stored in the storage unit;
    issuing a first request for issue of the electronic certificate, containing the identification information stored in the storage unit, to a certificate authority;
    determining whether or not the identification information stored in the storage unit is changed to identification information different than that contained in the first request after the first request is issued to the certificate authority and before an obtaining of the electronic certificate issued by the certificate authority in response to the first request;
    issuing a notification indicating an error, said error caused due to change of the identification information stored in said storage unit, the notification issued when it is determined in said determination step that the identification information stored in said storage unit is changed to identification information different than that contained in the first request; and
    issuing a second request for issue of a new electronic certificate, when it is determined in said determination step that the identification information stored in said storage unit is changed to identification information different than that contained in the first request.

5. A non-transitory computer-readable storage medium storing a program that, when executed by a computer, causes the computer to execute a method for controlling an information processing apparatus, the information processing apparatus including a storage unit configured to store identification information for identifying the information processing apparatus, the method comprising the steps of:
    setting the identification information, the set identification information being stored in the storage unit;
    changing the identification information stored in the storage unit;
    issuing a first request for issue of the electronic certificate, containing the identification information stored in the storage unit, to a certificate authority;
    determining whether or not the identification information stored in the storage unit is changed to identification information different than that contained in the first request after the first request is issued to the certificate authority and before an obtaining of the electronic certificate issued by the certificate authority in response to the first request;
    issuing a notification indicating an error, said error caused due to change of the identification information stored in the storage unit, the notification issued when it is determined in said determination step that the identification information stored in said storage unit is changed to identification information different than that contained in the first request; and
    issuing a second request for issue of a new electronic certificate, when it is determined in said determination step that the identification information stored in said storage unit is changed to identification information different than that contained in the first request.

6. An information processing apparatus that performs communication using an electronic certificate, comprising:
  a data storage system comprising a data storage device and storing at least a control program; and
  a data processing system comprising a CPU and coupled to the data storage system, the data processing system operative by the control program at least to:
  set identification information for identifying the information processing apparatus;
  change the identification information which has been set;
  store the set identification information in the data storage system;
  issue a first request for issue of the electronic certificate, containing the identification information stored in said data storage system, to a certificate authority;
  prevent the identification information stored in said data storage system from being changed to different identification information after the first request is issued to the certificate authority, and before an obtaining of the electronic certificate issued in response to the first request;
  issue a second request for cancellation of the first request to the certificate authority; and
  negate the prevention of change of the identification information stored in said data storage system after the first request is issued, and before an obtaining of the electronic certificate that is issued in response to the first request, if the second request is issued.

7. The information processing apparatus according to claim 6, wherein the data processing system is operative by the control program at least to:
  cause display of a screen for inputting identification information to which the identification information stored in said storage unit is changed and,
  prevent changing of the identification information stored in said storage unit to the input identification information.

8. The information processing apparatus according to claim 6, wherein the data processing system is operative by the control program at least to prevent displaying of a screen for inputting identification information to which the identification information stored in said storage unit is changed.

9. A control method for an information processing apparatus that performs communication using an electronic certificate, the apparatus comprising a storage unit configured to store identification information for identifying the information processing apparatus, the method comprising the steps of:
  setting the identification information, the set identification information being stored in the storage unit;
  changing the identification information stored in the storage unit;
  issuing a first request for issue of the electronic certificate, containing the identification information stored in the storage unit, to a certificate authority;
  preventing the identification information stored in said storage unit from being changed to different identification information after the first request is issued to the certificate authority, and before an obtaining of the electronic certificate that is issued by the certificate authority in response to the first request; and
  issuing a second request for cancellation of the first request to the certificate authority,
  wherein, if the second request is issued, the prevention of change of the identification information stored in said storage unit is negated after the first request is issued and before an obtaining of the electronic certificate that is issued by the certificate authority in response to the first request.

10. A non-transitory computer-readable storage medium storing a program that, when executed by a computer, causes the computer to execute a method for controlling an information processing apparatus, the information processing apparatus including a storage unit configured to store identification information for identifying the information processing apparatus, the method comprising the steps of:
  setting the identification information, the set identification information being stored in the storage unit;
  changing the identification information stored in the storage unit;
  issuing a first request for issue of the electronic certificate, containing the identification information stored in the storage unit, to a certificate authority;
  preventing the identification information stored in said storage unit from being changed to different identification information after the first request is issued to the certificate authority, and before an obtaining of the electronic certificate that is issued by the certificate authority in response to the first request; and
  issuing a second request for cancellation of the first request to the certificate authority,
  wherein, if the second request is issued, the prevention of change of the identification information stored in said storage unit is negated after the first request is issued and before an obtaining of the electronic certificate that is issued by the certificate authority in response to the first request.

* * * * *